(12) United States Patent
Mao et al.

(10) Patent No.: US 10,952,152 B2
(45) Date of Patent: Mar. 16, 2021

(54) PATH LOSS DETERMINING METHOD AND APPARATUS

(71) Applicant: Huawei Technologies Co., Ltd., Shenzhen (CN)

(72) Inventors: Qiqi Mao, Chengdu (CN); Shitong Yuan, Chengdu (CN); Xiaoyong Tang, Shenzhen (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/727,651

(22) Filed: Dec. 26, 2019

(65) Prior Publication Data

US 2020/0137691 A1    Apr. 30, 2020

Related U.S. Application Data

(63) Continuation of application No. PCT/CN2018/092251, filed on Jun. 21, 2018.

(30) Foreign Application Priority Data

Jun. 26, 2017  (CN) .......................... 201710495426.2

(51) Int. Cl.
*H04W 52/24* (2009.01)

(52) U.S. Cl.
CPC ....... *H04W 52/241* (2013.01); *H04W 52/242* (2013.01)

(58) Field of Classification Search
CPC ....... H04B 17/309; H04B 17/318; H04L 1/00; H04L 5/00; H04W 52/14; H04W 52/16;
(Continued)

(56) References Cited

U.S. PATENT DOCUMENTS

| 10,187,180 B2 * | 1/2019 | Sorrentino ............ H04L 1/0026 |
| 2013/0272170 A1 * | 10/2013 | Chatterjee ............ H04L 5/0094 370/280 |

(Continued)

FOREIGN PATENT DOCUMENTS

| CN | 103096448 A | 5/2013 |
| CN | 103582099 A | 2/2014 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.3.0, pp. 1-460, 3rd Generation Partnership Project, Valbonne, France (Jun. 2017).

(Continued)

*Primary Examiner* — Tan H Trinh
(74) *Attorney, Agent, or Firm* — Leydig, Voit & Mayer, Ltd.

(57) ABSTRACT

A path loss determining method and apparatus are provided to satisfy a path loss measurement requirement when there are different transmit powers. The method includes: measuring receive power of a signal sent by a network device; determining transmit power of the signal based on pre-configuration information, where the pre-configuration information is used to indicate correspondences between a plurality of signals and transmit powers, transmit powers of some or all of the plurality of signals are different, and the signal is one of the plurality of signals; and determining a path loss based on the receive power of the signal and the transmit power of the signal.

15 Claims, 4 Drawing Sheets

(58) Field of Classification Search
CPC . H04W 52/24; H04W 52/241; H04W 52/242; H04W 52/54; H04W 72/04
USPC .................. 455/69, 522; 370/280, 311, 329
See application file for complete search history.

(56) References Cited

U.S. PATENT DOCUMENTS

| | | |
|---|---|---|
| 2014/0113677 A1 | 4/2014 | Parkvall et al. |
| 2014/0161093 A1* | 6/2014 | Hoshino ............... H04B 7/024 370/329 |
| 2014/0162717 A1* | 6/2014 | Liu ...................... H04L 5/0035 455/522 |
| 2014/0177531 A1* | 6/2014 | Imamura .............. H04L 5/0035 370/328 |
| 2014/0286219 A1* | 9/2014 | Siomina .............. H04J 11/0023 370/311 |
| 2015/0117381 A1 | 4/2015 | Khoshnevis et al. |
| 2015/0133179 A1 | 5/2015 | Li et al. |
| 2015/0146545 A1 | 5/2015 | Davydov et al. |
| 2017/0078971 A1* | 3/2017 | Noh ......................... H04L 5/14 |
| 2017/0195028 A1* | 7/2017 | Shimezawa ............. H04L 69/22 |
| 2017/0245165 A1* | 8/2017 | Onggosanusi ........ H04L 5/0057 |
| 2017/0347379 A1* | 11/2017 | Islam .................. H04W 52/245 |
| 2018/0152882 A1* | 5/2018 | Frenger ................ H04W 48/12 |
| 2018/0160372 A1* | 6/2018 | Benjebbour ........ H04W 52/241 |
| 2018/0205577 A1* | 7/2018 | Shin ..................... H04B 7/0478 |
| 2019/0090126 A1* | 3/2019 | Hayashi ................ H04W 72/04 |
| 2019/0174423 A1* | 6/2019 | Zhang ................ H04W 52/241 |
| 2019/0190747 A1* | 6/2019 | Park ...................... H04L 5/0057 |
| 2019/0215044 A1* | 7/2019 | Noh ....................... H04L 5/1469 |
| 2020/0037258 A1* | 1/2020 | Tang .................. H04W 52/241 |

FOREIGN PATENT DOCUMENTS

| | | |
|---|---|---|
| CN | 103621155 A | 3/2014 |
| CN | 103748938 A | 4/2014 |
| CN | 103891161 A | 6/2014 |
| EP | 2770785 B1 | 6/2016 |

OTHER PUBLICATIONS

"WF on UL power control," 3GPP TSG RAN WG1 Meeting #89, Hangzhou, P.R. China, R1-1709659, pp. 1-3, 3rd Generation Partnership Project, Valbonne, France (May 15-19, 2017).

"3rd Generation Partnership Project; Technical Specification Group Radio Access Network; NR; Physical layer measurements (Release 15)," 3GPP TS 38.215 V0.0.0, pp. 1-6, 3rd Generation Partnership Project, Valbonne, France (May 2017).

"3rd Generation Partnership Project; Technical Specification Group Radio Access Network; NR; Radio Resource Control (RRC); Protocol specification (Release 15)," 3GPP TS 38.331 V0.0.4, R2-1707187, pp. 1-22, 3rd Generation Partnership Project, Valbonne, France (Jun. 2017).

"UL Power Control for MIMO," 3GPP TSG RAN WG1 NR Ad-Hoc #2, Qingdao, P.R. China, R1-1711397, pp. 1-6, 3rd Generation Partnership Project, Valbonne, France (Jun. 27-30, 2017).

"On path loss estimation for UL power control," 3GPP TSG-RAN WG1 #88bis, Spokane, USA, R1-1705915, pp. 1-4, XP051252246, 3rd Generation Partnership Project, Valbonne, France (Apr. 3-7, 2017).

"Discussion of RS for DL beam management," 3GPP TSG RAN WG1 NR Ad-Hoc#2, Qingdao, China, R1-1710595, pp. 1-3, XP051304298, 3rd Generation Partnership Project, Valbonne, France (Jun. 27-30, 2017).

* cited by examiner

PATH LOSS DETERMINING METHOD AND APPARATUS

CROSS-REFERENCE TO RELATED APPLICATIONS

This application is a continuation of International Application No. PCT/CN2018/092251, filed on Jun. 21, 2018, which claims priority to Chinese Patent Application No. 201710495426.2, filed on Jun. 26, 2017. The disclosures of the aforementioned applications are hereby incorporated by reference in their entireties.

TECHNICAL FIELD

Embodiments of this application relate to the communications field, and more specifically, to a path loss determining method and apparatus.

BACKGROUND

With continuous development of communications technologies, new service types and data requirements are emerging. An existing communications system, for example, a long term evolution (LTE) system, has difficulty in providing a sufficient capacity. To deal with a large quantity of newly added data service requirements, when formulating a new communication standard, the industry expands frequency spectrums used for wireless communication. New frequency spectrums are mainly concentrated in a high frequency band. In a high-frequency communications system, a signal is transmitted through beamforming to adapt to a high frequency characteristic.

To compensate for a path loss so that an uplink signal is received by a base station, a user terminal needs to measure the path loss by using a downlink reference signal, and perform uplink power control compensation by using the path loss to obtain an uplink transmit power. Therefore, if the user terminal intends to measure a downlink path loss, the user terminal needs to learn of a transmit power of the downlink reference signal. Usually, in the LTE system, the base station notifies the user terminal of a transmit power of only one reference signal.

However, in a high-frequency communications system, transmit powers of signals may be different. If the manner in which the base station notifies the user terminal of a transmit power of only one reference signal in the LTE system is still used, it is possible that a path loss measurement requirement cannot be satisfied when there are different transmit powers.

SUMMARY

This application provides a path loss determining method and apparatus, to satisfy a path loss measurement requirement when there are different transmit powers.

According to a first aspect, a path loss determining method is provided. The method includes: measuring a receive power of a signal sent by a network device; determining a transmit power of the signal based on pre-configuration information, where the pre-configuration information is used to indicate correspondences between a plurality of signals and transmit powers, transmit powers of some or all of the plurality of signals are different, and the signal is one of the plurality of signals; and determining a path loss based on the receive power of the signal and the transmit power of the signal.

In the method provided in this application, the correspondences between the plurality of signals and the transmit powers are pre-configured, so that when the path loss is estimated by using a signal, a transmit power corresponding to the signal can be determined based on the pre-configured correspondences. In this way, a relatively accurate transmit power can be obtained when there are different transmit powers, thereby calculating a relatively accurate path loss. Therefore, compared with the prior art, the method provided in this application can effectively satisfy a path loss measurement requirement when there are different transmit powers.

Further, the path loss obtained by using the method provided in this application may be used to determine an uplink transmit power. Therefore, the method provided in this application can further implement proper uplink power control.

With reference to the first aspect, in a possible implementation of the first aspect, the pre-configuration information is used to indicate correspondences between a plurality of signal groups and transmit powers, where the plurality of signal groups are obtained by classifying the plurality of signals, signals in a same signal group have a same transmit power, and some or all of the plurality of signal groups have different transmit powers. The determining a transmit power of the signal based on pre-configuration information includes: determining a signal group to which the signal belongs, and determining a transmit power corresponding to the signal group to which the signal belongs as the transmit power of the signal.

In the solution provided in this application, all or some signals having a same transmit power in the plurality of signals are classified into one signal group. Then, the correspondences between the plurality of signal groups and the transmit powers are pre-configured. Subsequently, the transmit power of the signal is determined based on the pre-configured correspondences. Therefore, the solution provided in this application can reduce signaling overheads of the pre-configuration information.

With reference to the first aspect, in a possible implementation of the first aspect, the pre-configuration information includes the correspondences between the plurality of signal groups and the transmit powers.

With reference to the first aspect, in a possible implementation of the first aspect, the pre-configuration information includes a transmit power reference value, and further includes correspondences between the plurality of signal groups and transmit power offset values, where the transmit power reference value is a transmit power of one signal in the plurality of signal groups or is a transmit power of one of the plurality of signal groups. The determining a transmit power of the signal based on pre-configuration information includes: adding the transmit power reference value to a transmit power offset value corresponding to the signal group to which the signal belongs, and determining a result of the addition as the transmit power of the signal.

In the solution provided in this application, the correspondences between the plurality of signals and the transmit powers are pre-configured in a case of same transmit and receive beamforming gain differences of a base station, so that when the path loss is estimated by using a signal, a transmit power corresponding to the signal can be determined based on the pre-configured correspondences. In this way, a relatively accurate transmit power can be obtained when there are different transmit powers, thereby calculating a relatively accurate path loss. Therefore, compared with the prior art, the method provided in this application can effectively satisfy a path loss measurement requirement when there are different transmit powers.

With reference to the first aspect, in a possible implementation of the first aspect, the pre-configuration information is used to indicate the correspondences between the plurality of signal groups and the transmit powers, and the pre-configuration information further includes correspondences between the plurality of signal groups and transmit and receive beamforming gain differences. The method further includes: determining a transmit and receive beamforming gain difference corresponding to the signal group to which the signal belongs as a transmit and receive beamforming gain difference of the signal. The determining a path loss includes: adding the transmit power of the signal to the transmit and receive beamforming gain difference of the signal, subtracting the receive power of the signal from a result of the addition, and determining the path loss based on a result of the subtraction.

With reference to the first aspect, in a possible implementation of the first aspect, the pre-configuration information is used to indicate the correspondences between the plurality of signal groups and the transmit powers, and the pre-configuration information further includes a reference value of a transmit and receive beamforming gain difference, and further includes correspondences between the plurality of signal groups and offset values of transmit and receive beamforming gain differences, where the reference value of a transmit and receive beamforming gain difference is a transmit and receive beamforming gain difference of one signal in the plurality of signal groups or is a transmit and receive beamforming gain difference of one of the plurality of signal groups. The method further includes: adding the reference value of a transmit and receive beamforming gain difference to an offset value of a transmit and receive beamforming gain difference corresponding to the signal group to which the signal belongs, and determining a result of the addition as a transmit and receive beamforming gain difference of the signal. The determining a path loss includes: adding the transmit power of the signal to the transmit and receive beamforming gain difference of the signal, subtracting the receive power of the signal from a result of the addition, and determining the path loss based on a result of the subtraction.

In the solution provided in this application, the correspondences between the plurality of signal groups and the transmit powers and the correspondences between the plurality of signal groups and the transmit and receive beamforming gain differences are pre-configured in a case of different transmit and receive beamforming gain differences of a base station, so that when the path loss is estimated by using a signal, a transmit power and a transmit and receive beamforming gain difference that correspond to the signal can be determined based on the pre-configured correspondences. In this way, a relatively accurate transmit power and transmit and receive beamforming gain difference can be obtained when there are different transmit powers, thereby calculating a relatively accurate path loss. Therefore, compared with the prior art, the method provided in this application can effectively satisfy a path loss measurement requirement when there are different transmit powers.

With reference to the first aspect, in a possible implementation of the first aspect, the pre-configuration information is used to indicate correspondences between the plurality of signal groups and sums of transmit powers and transmit and receive beamforming gain differences. The determining a transmit power of the signal based on pre-configuration information includes: determining the signal group to which the signal belongs; and determining a sum of a transmit and receive beamforming gain difference and the transmit power that correspond to the signal group to which the signal belongs as a sum of a transmit and receive beamforming gain difference and the transmit power of the signal. The determining a path loss based on the receive power of the signal and the transmit power of the signal includes: subtracting the receive power of the signal from the sum of the transmit and receive beamforming gain difference and the transmit power of the signal, and determining the path loss based on a result of the subtraction.

With reference to the first aspect, in a possible implementation of the first aspect, the pre-configuration information includes correspondences between the plurality of signal groups and sums of transmit powers and transmit and receive beamforming gain differences. The determining a transmit power of the signal based on pre-configuration information includes: determining a sum of the transmit power and a transmit and receive beamforming gain difference that correspond to the signal group to which the signal belongs as a sum of the transmit power and a transmit and receive beamforming gain difference of the signal. The determining a path loss includes: subtracting the receive power of the signal from the sum of the transmit power and the transmit and receive beamforming gain difference of the signal, and determining the path loss based on a result of the subtraction.

With reference to the first aspect, in a possible implementation of the first aspect, the pre-configuration information includes a reference value of a sum of a transmit power and a transmit and receive beamforming gain difference, and further includes correspondences between the plurality of signal groups and offset values of sums of transmit powers and transmit and receive beamforming gain differences, where the reference value of a sum of a transmit power and the transmit and receive beamforming gain difference is a sum of a transmit power and a transmit and receive beamforming gain difference of one signal in the plurality of signal groups or is a sum of a transmit power and a transmit and receive beamforming gain difference of one of the plurality of signal groups. The determining a transmit power of the signal based on pre-configuration information includes: adding the reference value of a sum of a transmit power and a transmit and receive beamforming gain difference to an offset value of a sum of the transmit power and a transmit and receive beamforming gain difference that correspond to the signal group to which the signal belongs, and determining a result of the addition as a sum of the transmit power and a transmit and receive beamforming gain difference of the signal. The determining a path loss includes: subtracting the receive power of the signal from the sum of the transmit power and the transmit and receive beamforming gain difference of the signal, and determining the path loss based on a result of the subtraction.

In some of the foregoing implementations, optionally, the plurality of signal groups are a plurality of synchronization signal bursts SS bursts, and the plurality of SS bursts are obtained by classifying the plurality of signals, where each SS burst includes a plurality of synchronization signal blocks SS blocks, each SS block includes one primary synchronization signal PSS, one secondary synchronization signal SSS, and one physical broadcast channel-demodulation reference signal PBCH DMRS, and different SS bursts correspond to different transmit powers.

In some of the foregoing implementations, optionally, the plurality of signal groups are a plurality of synchronization signal burst sets SS burst sets, and the plurality of SS burst sets are obtained by classifying the plurality of signals, where each SS burst set includes a plurality of SS bursts, each SS burst includes a plurality of SS blocks, each SS block includes one PSS, one SSS, and one PBCH DMRS, and different SS bursts correspond to different transmit powers.

In some of the foregoing implementations, optionally, the plurality of signal groups are a plurality of SS blocks, and the plurality of SS blocks are obtained by classifying the plurality of signals, where each SS block includes one PSS, one SSS, and one PBCH DMRS.

In some of the foregoing implementations, optionally, the plurality of signals are a plurality of channel state information-reference signals CSI-RSs, and at least one of the following attributes of different CSI-RSs are different: CSI-RS resource locations, CSI-RS ports, CSI-RS resource location IDs, or CSI-RS port IDs.

In some of the foregoing implementations, optionally, the plurality of signal groups are a plurality of CSI-RS groups, and at least one of the following attributes of different CSI-RS groups are different: CSI-RS resource locations, CSI-RS ports, CSI-RS resource location IDs, or CSI-RS port IDs.

In some of the foregoing implementations, optionally, the plurality of signal groups may alternatively be a plurality of groups obtained through classification according to another classification reference. For example, the classification reference is classifying signals having a same transmit power into one signal group.

With reference to the first aspect, in a possible implementation of the first aspect, the pre-configuration information includes a transmit power of the first signal subgroup in each of the plurality of signal groups, and further includes correspondences between other signal subgroups than the first signal subgroup in each signal group and transmit power offset values, where each signal group includes a plurality of signal subgroups, and each signal subgroup includes at least one signal. The determining a transmit power of the signal based on pre-configuration information includes: determining a signal subgroup to which the signal belongs; and adding a transmit power of the first signal subgroup in the signal group to which the signal belongs to a transmit power offset value corresponding to the signal subgroup to which the signal belongs, and determining a result of the addition as the transmit power of the signal.

With reference to the first aspect, in a possible implementation of the first aspect, the pre-configuration information includes a transmit power of the first signal subgroup in each of the plurality of signal groups, and further includes correspondences between other signal subgroups than the first signal subgroup in each signal group and transmit power offset values, and the pre-configuration information further includes a transmit and receive beamforming gain difference of the first signal subgroup in each of the plurality of signal groups, and further includes correspondences between other signal subgroups than the first signal subgroup in each signal group and offset values of transmit and receive beamforming gain differences, where each signal group includes a plurality of signal subgroups, and each signal subgroup includes at least one signal. The determining a transmit power of the signal based on pre-configuration information includes: determining a signal subgroup to which the signal belongs. The method further includes: adding a transmit and receive beamforming gain difference of the first signal subgroup in the signal group to which the signal belongs to an offset value of a transmit and receive beamforming gain difference corresponding to the signal subgroup to which the signal belongs, and determining a result of the addition as a transmit and receive beamforming gain difference of the signal. The determining a path loss includes: adding the transmit power of the signal to the transmit and receive beamforming gain difference of the signal, subtracting the receive power of the signal from a result of the addition, and determining the path loss based on a result of the subtraction.

With reference to the first aspect, in a possible implementation of the first aspect, the pre-configuration information includes a sum of a transmit power and a transmit and receive beamforming gain difference of the first signal subgroup in each of the plurality of signal groups, and further includes correspondences between other signal subgroups than the first signal subgroup in each signal group and offset values of sums of transmit powers and transmit and receive beamforming gain differences, where each signal group includes a plurality of signal subgroups, and each signal subgroup includes at least one signal. The determining a transmit power of the signal based on pre-configuration information includes: determining a signal subgroup to which the signal belongs; and adding a sum of a transmit power and a transmit and receive beamforming gain difference of the first signal subgroup in the signal group to which the signal belongs to an offset value of a sum of a transmit power and a transmit and receive beamforming gain difference that correspond to the signal subgroup to which the signal belongs, and determining a result of the addition as a sum of the transmit power and a transmit and receive beamforming gain difference of the signal. The determining a path loss includes: subtracting the receive power of the signal from the sum of the transmit power and the transmit and receive beamforming gain difference of the signal, and determining the path loss based on a result of the subtraction.

In this solution, the correspondences between the plurality of signal groups and the transmit powers and the correspondences between the plurality of signal groups and the transmit and receive beamforming gain differences are pre-configured in a case of different transmit and receive beamforming gain differences of a base station, so that when the path loss is estimated by using a signal, a transmit power and a transmit and receive beamforming gain difference that correspond to the signal can be determined based on the pre-configured correspondences. In this way, a relatively accurate transmit power and transmit and receive beamforming gain difference can be obtained when there are different transmit powers, thereby calculating a relatively accurate path loss. Therefore, compared with the prior art, the method provided in this application can effectively satisfy a path loss measurement requirement when there are different transmit powers.

In the foregoing implementations related to a signal subgroup, optionally, in an implementation, the plurality of signal groups are a plurality of synchronization signal bursts SS bursts, and the plurality of SS bursts are obtained by classifying the plurality of signals, where each SS burst includes a plurality of synchronization signal blocks SS blocks, each SS block includes one primary synchronization signal PSS, one secondary synchronization signal SSS, and one physical broadcast channel-demodulation reference signal PBCH DMRS, and different SS bursts correspond to different transmit powers. Optionally, the signal subgroup is an SS block.

In the foregoing implementations related to a signal subgroup, optionally, in an implementation, the plurality of signal groups are a plurality of synchronization signal burst sets SS burst sets, and the plurality of SS burst sets are obtained by classifying the plurality of signals, where each SS burst set includes a plurality of SS bursts, each SS burst includes a plurality of SS blocks, each SS block includes one PSS, one SSS, and one PBCH DMRS, and different SS bursts correspond to different transmit powers. The signal subgroup is an SS block or the signal subgroup is an SS burst.

With reference to the first aspect, in a possible implementation of the first aspect, the pre-configuration information is one of a plurality of types of pre-configuration information, and different pre-configuration information in the plurality of types of pre-configuration information indicates different correspondences between signals and transmit powers and/or different correspondences between signals and transmit and receive beamforming gain differences. The method further includes: receiving a notification message sent by the network device, where the notification message is used to instruct to determine the path loss by using the pre-configuration information.

With reference to the first aspect, in a possible implementation of the first aspect, the method further includes: obtaining the pre-configuration information from the network device by using any one of the following messages: a master information block MIB, a system information block SIB, a physical broadcast channel-demodulation reference signal PBCH DMRS, a radio resource control RRC message, a media access control control element MAC-CE, and downlink control information DCI.

With reference to the first aspect, in a possible implementation of the first aspect, the method further includes: obtaining an update indication from the network device by using at least one of a master information block MIB or a system information block SIB, where the update indication is used to indicate that the pre-configuration information has been updated; and obtaining, from the network device by using any one of the following messages, information that has been updated in the pre-configuration information: an RRC message, a MAC-CE, and DCI.

According to a second aspect, a communication method is provided. The communication method includes: generating pre-configuration information, where the pre-configuration information is used to indicate correspondences between a plurality of signals and transmit powers, and transmit powers of some or all of the plurality of signals are different; and sending the pre-configuration information to a terminal, so that the terminal determines a transmit power of one or more of the plurality of signals based on the pre-configuration information.

In the method provided in this application, a base station pre-configures the correspondences between the plurality of signals and the transmit powers, and sends the corresponding pre-configuration information to the terminal, so that when estimating a path loss by using a signal, the terminal can determine, based on the pre-configured correspondences, a transmit power corresponding to the signal. In this way, a relatively accurate transmit power can be obtained when there are different transmit powers, thereby calculating a relatively accurate path loss. Therefore, compared with the prior art, the method provided in this application can effectively satisfy a path loss measurement requirement when there are different transmit powers.

Further, the path loss obtained by using the method provided in this application may be used to determine an uplink transmit power. Therefore, the method provided in this application can further implement proper uplink power control.

With reference to the second aspect, in a possible implementation of the second aspect, the pre-configuration information is used to indicate correspondences between a plurality of signal groups and transmit powers, where the plurality of signal groups are obtained by classifying the plurality of signals, signals in a same signal group have a same transmit power, and some or all of the plurality of signal groups have different transmit powers.

In the solution provided in this application, all or some signals having a same transmit power in the plurality of signals are classified into one signal group. Then, the correspondences between the plurality of signal groups and the transmit powers are pre-configured. Subsequently, the transmit power of the signal is determined based on the pre-configured correspondences. Therefore, the solution provided in this application can reduce signaling overheads of the pre-configuration information.

With reference to the second aspect, in a possible implementation of the second aspect, the pre-configuration information includes the correspondences between the plurality of signal groups and the transmit powers.

With reference to the second aspect, in a possible implementation of the second aspect, the pre-configuration information includes a transmit power reference value, and further includes correspondences between the plurality of signal groups and transmit power offset values, where the transmit power reference value is a transmit power of one signal in the plurality of signal groups or is a transmit power of one of the plurality of signal groups.

In the solution provided in this application, in a case of same transmit and receive beamforming gain differences of the base station, the base station pre-configures the correspondences between the plurality of signal groups and the transmit powers, and sends the corresponding pre-configuration information to the terminal, so that when estimating a path loss by using a signal, the terminal can determine, based on the pre-configured correspondences, a transmit power corresponding to the signal. In this way, a relatively accurate transmit power can be obtained when there are different transmit powers, thereby calculating a relatively accurate path loss. Therefore, compared with the prior art, the method provided in this application can effectively satisfy a path loss measurement requirement when there are different transmit powers.

With reference to the second aspect, in a possible implementation of the second aspect, the pre-configuration information further includes correspondences between the plurality of signal groups and transmit and receive beamforming gain differences.

With reference to the second aspect, in a possible implementation of the second aspect, the pre-configuration information further includes a reference value of a transmit and receive beamforming gain difference, and further includes correspondences between the plurality of signal groups and offset values of transmit and receive beamforming gain differences, where the reference value of a transmit and receive beamforming gain difference is a transmit and receive beamforming gain difference of one signal in the plurality of signal groups or is a transmit and receive beamforming gain difference of one of the plurality of signal groups.

With reference to the second aspect, in a possible implementation of the second aspect, the pre-configuration information includes correspondences between the plurality of signal groups and sums of transmit powers and transmit and receive beamforming gain differences.

With reference to the second aspect, in a possible implementation of the second aspect, the pre-configuration information includes a reference value of a sum of a transmit power and a transmit and receive beamforming gain difference, and further includes correspondences between the plurality of signal groups and offset values of sums of transmit powers and transmit and receive beamforming gain differences.

In the solution provided in this application, in a case of different transmit and receive beamforming gain differences of the base station, the base station pre-configures the correspondences between the plurality of signal groups and the transmit powers, and sends the corresponding pre-configuration information to the terminal, so that when estimating a path loss by using a signal, the terminal can determine, based on the pre-configured correspondences, a transmit power and a transmit and receive beamforming gain difference that correspond to the signal. In this way, a relatively accurate transmit power and transmit and receive beamforming gain difference can be obtained when there are different transmit powers, thereby calculating a relatively accurate path loss. Therefore, compared with the prior art, the method provided in this application can effectively satisfy a path loss measurement requirement when there are different transmit powers.

With reference to the second aspect, in a possible implementation of the second aspect, the pre-configuration information includes a transmit power of the first signal subgroup in each of the plurality of signal groups, and further includes correspondences between other signal subgroups than the first signal subgroup in each signal group and transmit power offset values, where each signal group includes a plurality of signal subgroups, and each signal subgroup includes at least one signal.

In some of the foregoing implementations, optionally, the plurality of signal groups are a plurality of synchronization signal bursts SS bursts, and the plurality of SS bursts are obtained by classifying the plurality of signals, where each SS burst includes a plurality of synchronization signal blocks SS blocks, each SS block includes one primary synchronization signal PSS, one secondary synchronization signal SSS, and one physical broadcast channel-demodulation reference signal PBCH DMRS, and different SS bursts correspond to different transmit powers.

In some of the foregoing implementations, optionally, the plurality of signal groups are a plurality of synchronization signal burst sets SS burst sets, and the plurality of SS burst sets are obtained by classifying the plurality of signals, where each SS burst set includes a plurality of SS bursts, each SS burst includes a plurality of SS blocks, each SS block includes one PSS, one SSS, and one PBCH DMRS, and different SS bursts correspond to different transmit powers.

In some of the foregoing implementations, optionally, the plurality of signal groups are a plurality of SS blocks, and the plurality of SS blocks are obtained by classifying the plurality of signals, where each SS block includes one PSS, one SSS, and one PBCH DMRS.

In some of the foregoing implementations, optionally, the plurality of signals are a plurality of channel state information-reference signals CSI-RSs, and at least one of the following attributes of different CSI-RSs are different: CSI-RS resource locations, CSI-RS ports, CSI-RS resource location IDs, or CSI-RS port IDs.

In some of the foregoing implementations, optionally, the plurality of signal groups are a plurality of CSI-RS groups, and at least one of the following attributes of different CSI-RS groups are different: CSI-RS resource locations, CSI-RS ports, CSI-RS resource location IDs, or CSI-RS port IDs.

In some of the foregoing implementations, optionally, the plurality of signal groups may alternatively be a plurality of groups obtained through classification according to another classification reference. For example, the classification reference is classifying signals having a same transmit power into one signal group.

With reference to the second aspect, in a possible implementation of the second aspect, the pre-configuration information further includes a transmit and receive beamforming gain difference of the first signal subgroup in each of the plurality of signal groups, and further includes correspondences between other signal subgroups than the first signal subgroup in each signal group and offset values of transmit and receive beamforming gain differences.

With reference to the second aspect, in a possible implementation of the second aspect, the pre-configuration information includes a sum of a transmit power and a transmit and receive beamforming gain difference of the first signal subgroup in each of the plurality of signal groups, and further includes correspondences between other signal subgroups than the first signal subgroup in each signal group and offset values of sums of transmit powers and transmit and receive beamforming gain differences, where each signal group includes a plurality of signal subgroups, and each signal subgroup includes at least one signal.

In the foregoing implementations related to a signal subgroup, optionally, in an implementation, the plurality of signal groups are a plurality of synchronization signal bursts SS bursts, and the plurality of SS bursts are obtained by classifying the plurality of signals, where each SS burst includes a plurality of synchronization signal blocks SS blocks, each SS block includes one primary synchronization signal PSS, one secondary synchronization signal SSS, and one physical broadcast channel-demodulation reference signal PBCH DMRS, and different SS bursts correspond to different transmit powers. Optionally, the signal subgroup is an SS block.

In the foregoing implementations related to a signal subgroup, optionally, in an implementation, the plurality of signal groups are a plurality of synchronization signal burst sets SS burst sets, and the plurality of SS burst sets are obtained by classifying the plurality of signals, where each SS burst set includes a plurality of SS bursts, each SS burst includes a plurality of SS blocks, each SS block includes one PSS, one SSS, and one PBCH DMRS, and different SS bursts correspond to different transmit powers. The signal subgroup is an SS block or the signal subgroup is an SS burst.

With reference to the second aspect, in a possible implementation of the second aspect, the pre-configuration information is one of a plurality of types of pre-configuration information, and different pre-configuration information in the plurality of types of pre-configuration information indicates different correspondences between signals and transmit powers and/or different correspondences between signals and transmit and receive beamforming gain differences. The communication method further includes: sending a notification message to the terminal, where the notification message is used to instruct to determine a path loss by using the pre-configuration information.

With reference to the second aspect, in a possible implementation of the second aspect, the sending the pre-configuration information to a terminal includes: sending the pre-configuration information to the terminal by using any one of the following messages: a master information block MIB, a system information block SIB, a physical broadcast channel-demodulation reference signal PBCH DMRS, a radio resource control RRC message, a media access control control element MAC-CE, and downlink control information DCI.

With reference to the second aspect, in a possible implementation of the second aspect, the communication method further includes: sending an update indication to the terminal by using at least one of a master information block MIB or a system information block SIB, where the update indication is used to indicate that the pre-configuration information has been updated; and sending, to the terminal by using any one of the following messages, information that has been updated in the pre-configuration information: an RRC message, a MAC-CE, and DCI.

According to a third aspect, a terminal is provided. The terminal includes:

a receiving unit, configured to receive a signal sent by a network device; and a processing unit, configured to measure a receive power of the signal sent by the network device, where the processing unit is further configured to determine a transmit power of the signal based on pre-configuration information, where the pre-configuration information is used to indicate correspondences between a plurality of signals and transmit powers, transmit powers of some or all of the plurality of signals are different, and the signal is one of the plurality of signals; and the processing unit is further configured to determine a path loss based on the receive power of the signal and the transmit power of the signal.

With reference to the third aspect, in a possible implementation of the third aspect, the pre-configuration information is used to indicate correspondences between a plurality of signal groups and transmit powers, where the plurality of signal groups are obtained by classifying the plurality of signals, signals in a same signal group have a same transmit power, and some or all of the plurality of signal groups have different transmit powers; and the processing unit is specifically configured to: determine a signal group to which the signal belongs, and determine a transmit power corresponding to the signal group to which the signal belongs as the transmit power of the signal.

With reference to the third aspect, in a possible implementation of the third aspect, the pre-configuration information includes the correspondences between the plurality of signal groups and the transmit powers.

With reference to the third aspect, in a possible implementation of the third aspect, the pre-configuration information includes a transmit power reference value, and further includes correspondences between the plurality of signal groups and transmit power offset values, where the transmit power reference value is a transmit power of one signal in the plurality of signal groups or is a transmit power of one of the plurality of signal groups; and the processing unit is specifically configured to: add the transmit power reference value to a transmit power offset value corresponding to the signal group to which the signal belongs, and determine a result of the addition as the transmit power of the signal.

With reference to the third aspect, in a possible implementation of the third aspect, the pre-configuration information further includes correspondences between the plurality of signal groups and transmit and receive beamforming gain differences;

the processing unit is further configured to determine a transmit and receive beamforming gain difference corresponding to the signal group to which the signal belongs as a transmit and receive beamforming gain difference of the signal; and the processing unit is specifically configured to: add the transmit power of the signal to the transmit and receive beamforming gain difference of the signal, subtract the receive power of the signal from a result of the addition, and determine the path loss based on a result of the subtraction.

With reference to the third aspect, in a possible implementation of the third aspect, the pre-configuration information further includes a reference value of a transmit and receive beamforming gain difference, and further includes correspondences between the plurality of signal groups and offset values of transmit and receive beamforming gain differences, where the reference value of a transmit and receive beamforming gain difference is a transmit and receive beamforming gain difference of one signal in the plurality of signal groups or is a transmit and receive beamforming gain difference of one of the plurality of signal groups;

the processing unit is further configured to: add the reference value of a transmit and receive beamforming gain difference to an offset value of a transmit and receive beamforming gain difference corresponding to the signal group to which the signal belongs, and determine a result of the addition as a transmit and receive beamforming gain difference of the signal; and the processing unit is specifically configured to: add the transmit power of the signal to the transmit and receive beamforming gain difference of the signal, subtract the receive power of the signal from a result of the addition, and determine the path loss based on a result of the subtraction.

With reference to the third aspect, in a possible implementation of the third aspect, the pre-configuration information includes correspondences between the plurality of signal groups and sums of transmit powers and transmit and receive beamforming gain differences;

the processing unit is specifically configured to determine a sum of the transmit power and a transmit and receive beamforming gain difference that correspond to the signal group to which the signal belongs as a sum of the transmit power and a transmit and receive beamforming gain difference of the signal; and the processing unit is specifically configured to: subtract the receive power of the signal from the sum of the transmit power and the transmit and receive beamforming gain difference of the signal, and determine the path loss based on a result of the subtraction.

With reference to the third aspect, in a possible implementation of the third aspect, the pre-configuration information includes a reference value of a sum of a transmit power and a transmit and receive beamforming gain difference, and further includes correspondences between the plurality of signal groups and offset values of sums of transmit powers and transmit and receive beamforming gain differences, where the reference value of a sum of a transmit power and a transmit and receive beamforming gain difference is a sum of a transmit power and a transmit and receive beamforming gain difference of one signal in the plurality of signal groups or is a sum of a transmit power and a transmit and receive beamforming gain difference of one of the plurality of signal groups;

the processing unit is specifically configured to: add the reference value of a sum of a transmit power and a transmit and receive beamforming gain difference to an offset value of a sum of the transmit power and a transmit and receive beamforming gain difference that correspond to the signal group to which the signal belongs, and determine a result of the addition as a sum of the transmit power and a transmit and receive beamforming gain difference of the signal; and the processing unit is specifically configured to: subtract the receive power of the signal from the sum of the transmit power and the transmit and receive beamforming gain difference of the signal, and determine the path loss based on a result of the subtraction.

With reference to the third aspect, in a possible implementation of the third aspect, the pre-configuration information includes a transmit power of the first signal subgroup in each of the plurality of signal groups, and further includes correspondences between other signal subgroups than the first signal subgroup in each signal group and transmit power offset values, where each signal group includes a plurality of signal subgroups, and each signal subgroup includes at least one signal;

the processing unit is specifically configured to: determine a signal subgroup to which the signal belongs; and add a transmit power of the first signal subgroup in the signal group to which the signal belongs to a transmit power offset value corresponding to the signal subgroup to which the signal belongs, and determine a result of the addition as the transmit power of the signal.

With reference to the third aspect, in a possible implementation of the third aspect, the pre-configuration information further includes a transmit and receive beamforming gain difference of the first signal subgroup in each of the plurality of signal groups, and further includes correspondences between other signal subgroups than the first signal subgroup in each signal group and offset values of transmit and receive beamforming gain differences;

the processing unit is further configured to: add a transmit and receive beamforming gain difference of the first signal subgroup in the signal group to which the signal belongs to an offset value of a transmit and receive beamforming gain difference corresponding to the signal subgroup to which the signal belongs, and determine a result of the addition as a transmit and receive beamforming gain difference of the signal; and the processing unit is specifically configured to: add the transmit power of the signal to the transmit and receive beamforming gain difference of the signal, subtract the receive power of the signal from a result of the addition, and determine the path loss based on a result of the subtraction.

With reference to the third aspect, in a possible implementation of the third aspect, the pre-configuration information includes a sum of a transmit power and a transmit and receive beamforming gain difference of the first signal subgroup in each of the plurality of signal groups, and further includes correspondences between other signal subgroups than the first signal subgroup in each signal group and offset values of sums of transmit powers and transmit and receive beamforming gain differences, where each signal group includes a plurality of signal subgroups, and each signal subgroup includes at least one signal;

the processing unit is specifically configured to: determine a signal subgroup to which the signal belongs; and add a sum of a transmit power and a transmit and receive beamforming gain difference of the first signal subgroup in the signal group to which the signal belongs to an offset value of a sum of a transmit power and a transmit and receive beamforming gain difference that correspond to the signal subgroup to which the signal belongs, and determine a result of the addition as a sum of the transmit power and a transmit and receive beamforming gain difference of the signal;

the processing unit is specifically configured to: subtract the receive power of the signal from the sum of the transmit power and the transmit and receive beamforming gain difference of the signal, and determine the path loss based on a result of the subtraction.

With reference to the third aspect, in a possible implementation of the third aspect, the plurality of signal groups are a plurality of synchronization signal bursts SS bursts, and the plurality of SS bursts are obtained by classifying the plurality of signals, where each SS burst includes a plurality of synchronization signal blocks SS blocks, each SS block includes one primary synchronization signal PSS, one secondary synchronization signal SSS, and one physical broadcast channel-demodulation reference signal PBCH DMRS, and different SS bursts correspond to different transmit powers; or the plurality of signal groups are a plurality of synchronization signal burst sets SS burst sets, and the plurality of SS burst sets are obtained by classifying the plurality of signals, where each SS burst set includes a plurality of SS bursts, each SS burst includes a plurality of SS blocks, each SS block includes one PSS, one SSS, and one PBCH DMRS, and different SS bursts correspond to different transmit powers.

With reference to the third aspect, in a possible implementation of the third aspect, the plurality of signal groups are a plurality of SS blocks, and the plurality of SS blocks are obtained by classifying the plurality of signals, where each SS block includes one PSS, one SSS, and one PBCH DMRS.

With reference to the third aspect, in a possible implementation of the third aspect, the plurality of signals are a plurality of channel state information-reference signals CSI-RSs, and at least one of the following attributes of different CSI-RSs are different: CSI-RS resource locations, CSI-RS ports, CSI-RS resource location IDs, or CSI-RS port IDs; or the plurality of signal groups are a plurality of CSI-RS groups, and at least one of the following attributes of different CSI-RS groups are different: CSI-RS resource locations, CSI-RS ports, CSI-RS resource location IDs, or CSI-RS port IDs.

With reference to the third aspect, in a possible implementation of the third aspect, the pre-configuration information is one of a plurality of types of pre-configuration information, and different pre-configuration information in the plurality of types of pre-configuration information indicates different correspondences between signals and transmit powers and/or different correspondences between signals and transmit and receive beamforming gain differences; and the receiving unit is further configured to receive a notification message sent by the network device, where the notification message is used to instruct to determine the path loss by using the pre-configuration information.

With reference to the third aspect, in a possible implementation of the third aspect, the receiving unit is further configured to obtain the pre-configuration information from the network device by using any one of the following messages: a master information block MIB, a system information block SIB, a physical broadcast channel-demodulation reference signal PBCH DMRS, a radio resource control RRC message, a media access control control element MAC-CE, and downlink control information DCI.

With reference to the third aspect, in a possible implementation of the third aspect, the receiving unit is further configured to: obtain an update indication from the network device by using at least one of a master information block MIB or a system information block SIB, where the update indication is used to indicate that the pre-configuration information has been updated; and obtain, from the network device by using any one of the following messages, information that has been updated in the pre-configuration information: an RRC message, a MAC-CE, and DCI.

According to a fourth aspect, a terminal is provided. The terminal includes a memory and a processor. The memory is configured to store an instruction, the processor is configured to execute the instruction stored in the memory, and the execution of the instruction stored in the memory enables the processor to perform the method according to the first aspect or any possible implementation of the first aspect.

According to a fifth aspect, a chip is provided. The chip includes a processor and a communications interface. The communications interface is configured to communicate with an external device. The processor is configured to perform the method according to the first aspect or any possible implementation of the first aspect.

Optionally, in an implementation, the chip may further include a memory. The memory stores an instruction. The processor is configured to execute the instruction stored in the memory. When the instruction is executed, the processor is configured to perform the method according to the first aspect or any possible implementation of the first aspect.

Optionally, in an implementation, the chip is integrated on a terminal.

According to a sixth aspect, a computer-readable storage medium is provided. The computer-readable storage medium stores an instruction. When the instruction is run on a computer, the computer is enabled to perform the method according to the first aspect or any possible implementation of the first aspect.

According to a seventh aspect, a computer program product including an instruction is provided. When the computer program product is run on a computer, the computer is enabled to perform the method according to the first aspect or any possible implementation of the first aspect.

According to an eighth aspect, a network device is provided. The network device includes:

a processing unit, configured to generate pre-configuration information, where the pre-configuration information is used to indicate correspondences between a plurality of signals and transmit powers, and transmit powers of some or all of the plurality of signals are different; and a sending unit, configured to send the pre-configuration information to a terminal, so that the terminal determines a transmit power of one or more of the plurality of signals based on the pre-configuration information.

With reference to the eighth aspect, in a possible implementation of the eighth aspect, the pre-configuration information is used to indicate correspondences between a plurality of signal groups and transmit powers, where the plurality of signal groups are obtained by classifying the plurality of signals, signals in a same signal group have a same transmit power, and some or all of the plurality of signal groups have different transmit powers.

With reference to the eighth aspect, in a possible implementation of the eighth aspect, the pre-configuration information includes the correspondences between the plurality of signal groups and the transmit powers.

With reference to the eighth aspect, in a possible implementation of the eighth aspect, the pre-configuration information includes a transmit power reference value, and further includes correspondences between the plurality of signal groups and transmit power offset values, where the transmit power reference value is a transmit power of one signal in the plurality of signal groups or is a transmit power of one of the plurality of signal groups.

With reference to the eighth aspect, in a possible implementation of the eighth aspect, the pre-configuration information further includes correspondences between the plurality of signal groups and transmit and receive beamforming gain differences.

With reference to the eighth aspect, in a possible implementation of the eighth aspect, the pre-configuration information further includes a reference value of a transmit and receive beamforming gain difference, and further includes correspondences between the plurality of signal groups and offset values of transmit and receive beamforming gain differences, where the reference value of a transmit and receive beamforming gain difference is a transmit and receive beamforming gain difference of one signal in the plurality of signal groups or is a transmit and receive beamforming gain difference of one of the plurality of signal groups.

With reference to the eighth aspect, in a possible implementation of the eighth aspect, the pre-configuration information includes correspondences between the plurality of signal groups and sums of transmit powers and transmit and receive beamforming gain differences.

With reference to the eighth aspect, in a possible implementation of the eighth aspect, the pre-configuration information includes a reference value of a sum of a transmit power and a transmit and receive beamforming gain difference, and further includes correspondences between the plurality of signal groups and offset values of sums of transmit powers and transmit and receive beamforming gain differences.

With reference to the eighth aspect, in a possible implementation of the eighth aspect, the pre-configuration information includes a transmit power of the first signal subgroup in each of the plurality of signal groups, and further includes correspondences between other signal subgroups than the first signal subgroup in each signal group and transmit power offset values, where each signal group includes a plurality of signal subgroups, and each signal subgroup includes at least one signal.

With reference to the eighth aspect, in a possible implementation of the eighth aspect, the pre-configuration information further includes a transmit and receive beamforming gain difference of the first signal subgroup in each of the plurality of signal groups, and further includes correspondences between other signal subgroups than the first signal subgroup in each signal group and offset values of transmit and receive beamforming gain differences.

With reference to the eighth aspect, in a possible implementation of the eighth aspect, the pre-configuration information includes a sum of a transmit power and a transmit and receive beamforming gain difference of the first signal subgroup in each of the plurality of signal groups, and further includes correspondences between other signal subgroups than the first signal subgroup in each signal group and offset values of sums of transmit powers and transmit and receive beamforming gain differences, where each signal group includes a plurality of signal subgroups, and each signal subgroup includes at least one signal.

With reference to the eighth aspect, in a possible implementation of the eighth aspect, the plurality of signal groups are a plurality of synchronization signal bursts SS bursts, and the plurality of SS bursts are obtained by classifying the plurality of signals, where each SS burst includes a plurality of synchronization signal blocks SS blocks, each SS block includes one primary synchronization signal PSS, one secondary synchronization signal SSS, and one physical broadcast channel-demodulation reference signal PBCH DMRS, and different SS bursts correspond to different transmit powers; or the plurality of signal groups are a plurality of synchronization signal burst sets SS burst sets, and the SS burst sets are obtained by classifying the plurality of signals, where each SS burst set includes a plurality of SS bursts, each SS burst includes a plurality of SS blocks, each SS block includes one PSS, one SSS, and one PBCH DMRS, and different SS bursts correspond to different transmit powers.

With reference to the eighth aspect, in a possible implementation of the eighth aspect, the plurality of signal groups are a plurality of SS blocks, and the plurality of SS blocks are obtained by classifying the plurality of signals, where each SS block includes one PSS, one SSS, and one PBCH DMRS.

With reference to the eighth aspect, in a possible implementation of the eighth aspect, the plurality of signals are a plurality of channel state information-reference signals CSI-RSs, and at least one of the following attributes of different CSI-RSs are different: CSI-RS resource locations, CSI-RS ports, CSI-RS resource location IDs, or CSI-RS port IDs; or the plurality of signal groups are a plurality of CSI-RS groups, and at least one of the following attributes of different CSI-RS groups are different: CSI-RS resource locations, CSI-RS ports, CSI-RS resource location IDs, or CSI-RS port IDs.

With reference to the eighth aspect, in a possible implementation of the eighth aspect, the pre-configuration information is one of a plurality of types of pre-configuration information, and different pre-configuration information in the plurality of types of pre-configuration information indicates different correspondences between signals and transmit powers and/or different correspondences between signals and transmit and receive beamforming gain differences; and the sending unit is further configured to send a notification message to the terminal, where the notification message is used to instruct to determine a path loss by using the pre-configuration information.

With reference to the eighth aspect, in a possible implementation of the eighth aspect, the sending unit is specifically configured to send the pre-configuration information to the terminal by using any one of the following messages: a master information block MIB, a system information block SIB, a physical broadcast channel-demodulation reference signal PBCH DMRS, a radio resource control RRC message, a media access control control element MAC-CE, and downlink control information DCI.

With reference to the eighth aspect, in a possible implementation of the eighth aspect, the sending unit is further configured to: send an update indication to the terminal by using at least one of a master information block MIB or a system information block SIB, where the update indication is used to indicate that the pre-configuration information has been updated; and send, to the terminal by using any one of the following messages, information that has been updated in the pre-configuration information: an RRC message, a MAC-CE, and DCI.

According to a ninth aspect, a network device is provided. The network device includes a memory and a processor. The memory is configured to store an instruction, the processor is configured to execute the instruction stored in the memory, and the execution of the instruction stored in the memory enables the processor to perform the method according to the second aspect or any possible implementation of the second aspect.

According to a tenth aspect, a chip is provided. The chip includes a processor and a communications interface. The communications interface is configured to communicate with an external device. The processor is configured to perform the method according to the second aspect or any possible implementation of the second aspect.

Optionally, in an implementation, the chip may further include a memory. The memory stores an instruction. The processor is configured to execute the instruction stored in the memory. When the instruction is executed, the processor is configured to perform the method according to the second aspect or any possible implementation of the second aspect.

Optionally, in an implementation, the chip is integrated on a terminal.

According to an eleventh aspect, a computer-readable storage medium is provided. The computer-readable storage medium stores an instruction. When the instruction is run on a computer, the computer is enabled to perform the method according to the second aspect or any possible implementation of the second aspect.

According to a twelfth aspect, a computer program product including an instruction is provided. When the computer program product is run on a computer, the computer is enabled to perform the method according to the second aspect or any possible implementation of the second aspect.

DESCRIPTION OF EMBODIMENTS

The following describes technical solutions of this application with reference to accompanying drawings.

Figure 1:
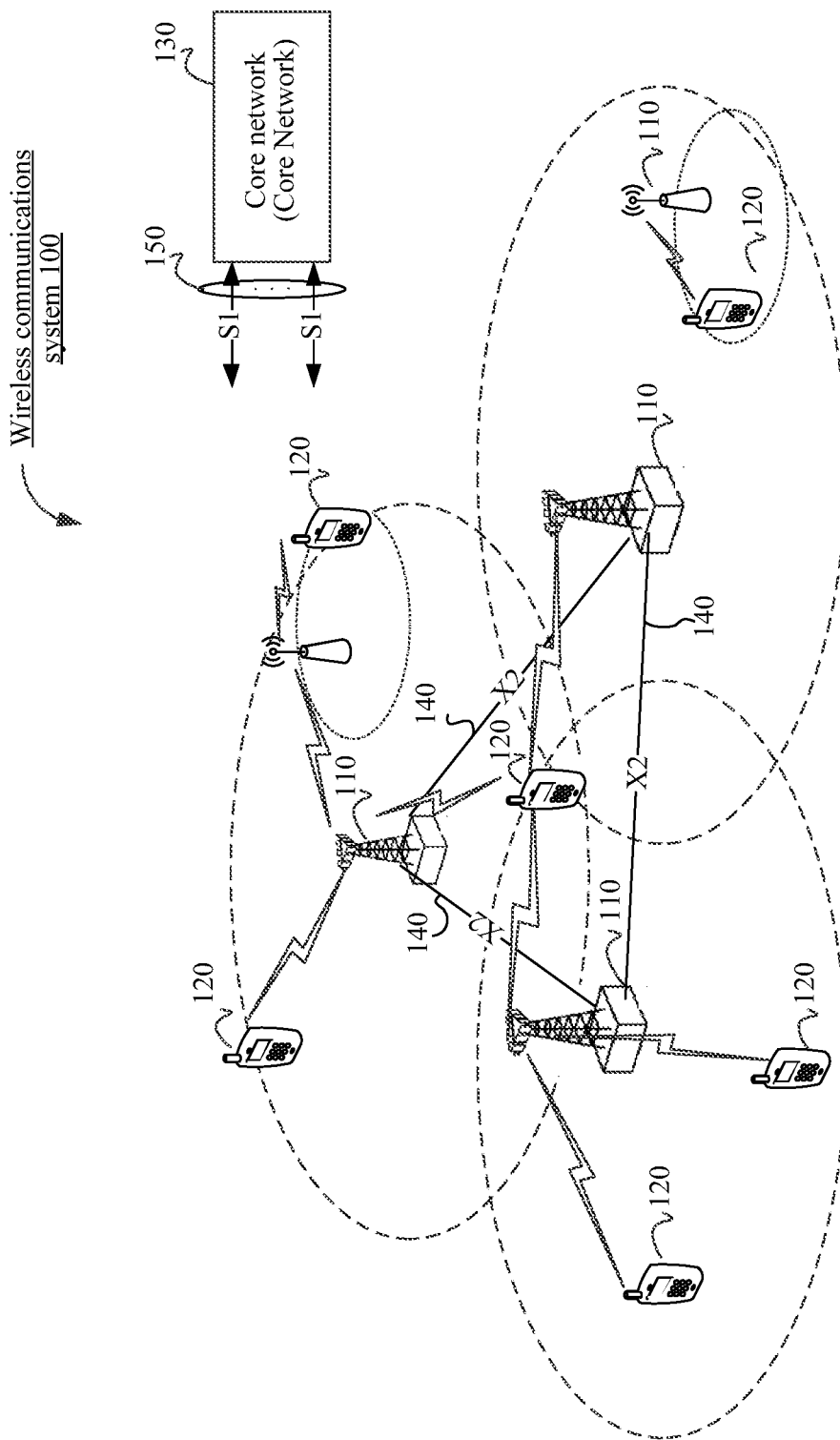
FIG. 1 is a schematic diagram of a typical application scenario according to an embodiment of the present invention.

FIG. 1 shows a wireless communications system 100 used in this application. The wireless communications system 100 may operate in a high frequency band, is not limited to a long term evolution (LTE) system, and may alternatively be a future evolved fifth-generation (the 5th Generation, 5G) mobile communications system, a new radio (NR) system, a machine-to-machine (M2M) communications system, or the like. As shown in FIG. 1, the wireless communications system 100 may include one or more network devices 110, one or more terminals 120, and a core network 130.

The network device 110 may be a base station. The base station may be configured to perform communication with one or more terminals, or may be configured to perform communication with one or more base stations having some terminal functions (for example, communication between a macro base station and a micro base station such as an access point). The base station may be a base transceiver station (BTS) in a time division-synchronous code division multiple access (TD-SCDMA) system, an evolved NodeB (eNB) in the LTE system, or a gNodeB in the 5G system or the new radio (NR) system. In addition, the base station may alternatively be an access point (AP), a transmission reception point (TRP), a central unit (CU), or another network entity, and may include some or all of functions of the foregoing network entities.

The terminals 120 may be distributed in the entire wireless communications system 100, and may be fixed or mobile. In some embodiments of this application, the terminal 120 may be a mobile device, a mobile station, a mobile unit, an M2M terminal, a wireless unit, a remote unit, a user agent, a mobile client, or the like.

Specifically, the network device 110 may be configured to communicate, under control of a network device controller (not shown), with the terminal 120 by using one or more antennas. In some embodiments, the network device controller may be a part of the core network 130, or may be integrated into the network device 110. Specifically, the network device 110 may be configured to transmit control information or user data to the core network 130 through a backhaul interface 150 (for example, an S1 interface). Specifically, the network devices 110 may also directly or indirectly communicate with each other through a backhaul interface 140 (for example, an X2 interface).

The wireless communications system shown in FIG. 1 is merely for a purpose of more clearly describing the technical solutions in this application, and is not intended to limit this application. A person of ordinary skill in the art may know that, as network architectures evolve and new service scenarios emerge, the technical solutions provided in the embodiments of the present invention are also applicable to a similar technical problem.

For ease of understanding and description of the embodiments of the present invention, with reference to FIG. 2, related content of a synchronization signal in a new radio (NR) system is first described as an example below.

Synchronization signal (SS): The SS is a signal used to provide a same time reference. The SS may include a primary synchronization signal (PSS) and a secondary synchronization signal (SSS).

Synchronization signal block (SS block): In NR, one PSS, one SSS, and one physical broadcast channel-demodulation reference signal (PBCH DMRS) constitute one spatial filtering (beam) resource block, and the resource block is referred to as a synchronization signal block (SS block).

Specifically, locations of the PSS, the SSS, and the PBCH DMRS in the SS block have a fixed time-domain distribution relationship, for example, may be adjacent. Specifically, the PSS, the SSS, and the PBCH DMRS may be OFDM symbols. The PSS, the SSS, and the PBCH DMRS may also be referred to as a PSS resource block, an SSS resource block, and a PBCH DMRS resource block respectively.

Synchronization signal burst (SS burst): A plurality of SS blocks constitute one SS burst. A plurality of SS bursts may constitute one synchronization signal burst set (SS burst set). Specific content is shown in FIG. 2.

Figure 2:
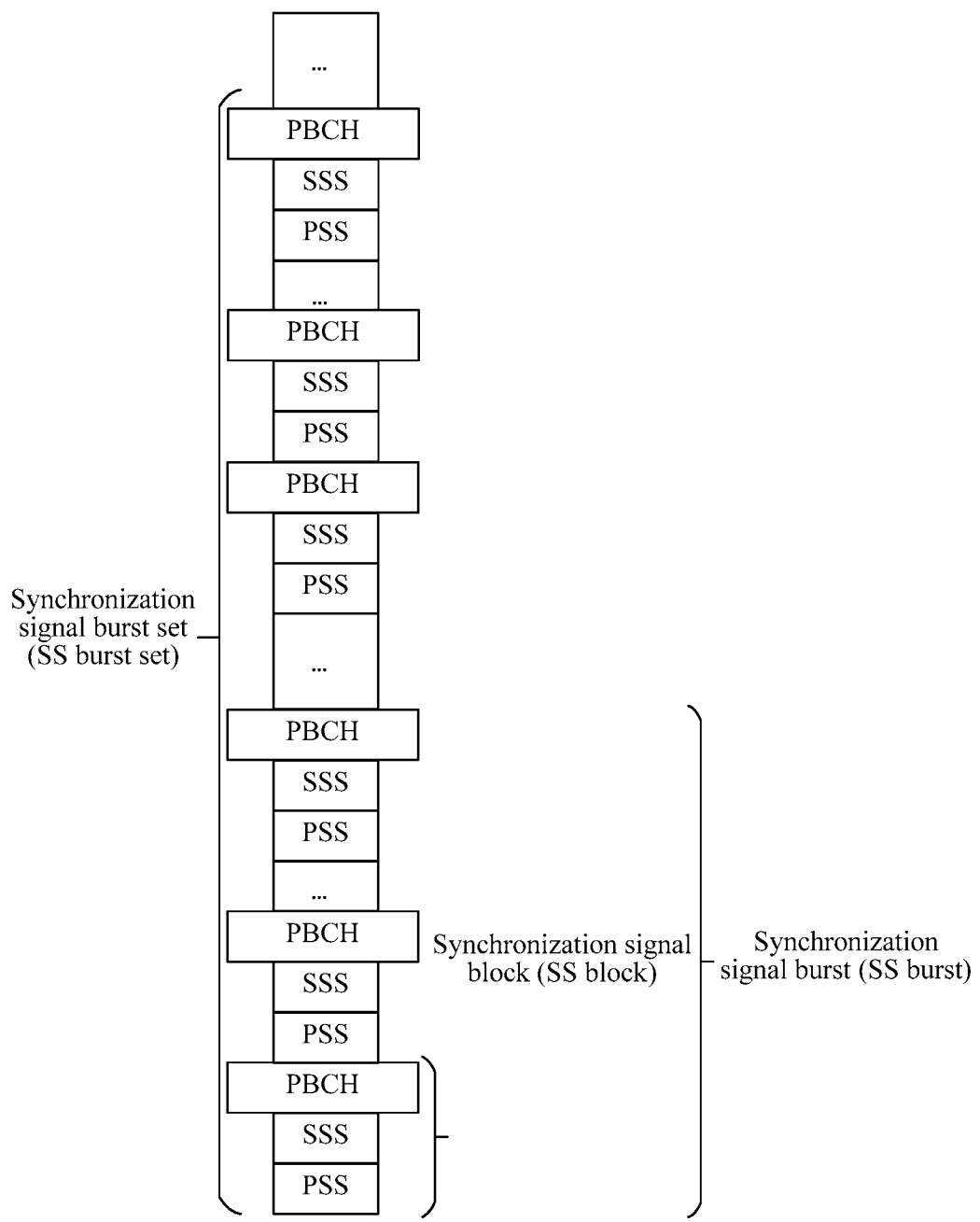
FIG. 2 is a schematic diagram of a synchronization signal according to an embodiment of the present invention.

The related content of the synchronization signal shown in FIG. 2 is merely for the purpose of more clearly describing the technical solutions in this application, and is not intended to limit this application. A person of ordinary skill in the art may know that, as network architectures evolve and new service scenarios emerge, the related content of the synchronization signal may change. For example, a resource block composed of one SSS, one PSS, and one PBCH DMRS may not be referred to as an SS block; or signals included in an SS block are not limited to an SSS, a PSS, or a PBCH DMRS; or a relationship between an SS block, an SS burst, and an SS burst set is not the relationship shown in FIG. 2. Even so, the technical solutions provided in the embodiments of the present invention are also applicable to a similar technical problem.

In addition, a "transmit and receive beamforming gain difference" is mentioned in the embodiments of the present invention, a complete expression thereof is a "transmit and receive beamforming gain difference of a base station". The "transmit and receive beamforming gain difference of a base station" is a difference between a transmit beamforming gain and a receive beamforming gain of the base station. The transmit beamforming gain may be obtained by using the following technology: The base station adjusts powers, phases, and directions of a plurality of transmit antennas, so that transmitted signals are superimposed and concentrated in a direction. The receive beamforming gain is relatively abstract. Because a receive end of a signal does not send a signal, there is no explicitly visible "beam". Nevertheless, a principle of obtaining the receive beamforming gain is similar to a principle of obtaining the transmit beamforming gain. The receive beamforming gain of the base station may be obtained by using the following technology: A same data stream (a same signal) received by a plurality of receive antennas of the base station is multiplied with weights, and then products are added up (for a fixed antenna direction, there is a relatively determined weight and an operation method), to obtain a signal having better quality. It should be understood that, for brevity of description, in descriptions of some embodiments, the "transmit and receive beamforming gain difference of the base station" is briefly referred to as the "transmit and receive beamforming gain difference".

In a high-frequency communications system, a signal is transmitted through beamforming. Because different beams have different beamforming gains, transmit powers of a base station differ when the base station transmits reference signals by using different beams. In this case, a user terminal obtains different path losses through measurement by using the downlink reference signals. That is, a path loss measurement result of the user terminal is related to a current transmission beam. For example, each time the transmission beam changes, the user terminal needs to re-calculate a pass loss, and perform uplink power control again. Moreover, because different base stations have different capabilities, transmit powers of reference signals sent by different base stations may be different. Therefore, path losses obtained through measurement by the user terminal are also different.

Therefore, in the high-frequency communications system, if a manner in an existing LTE system in which a base station notifies a user terminal of a transmit power of only one reference signal is used, it is possible that a path loss measurement requirement cannot be satisfied when there are different transmit powers. Consequently, uplink power control cannot be properly performed.

For the foregoing technical problem, the embodiments of the present invention provide a path loss determining method and apparatus. Correspondences between a plurality of signals and transmit powers are pre-configured to satisfy a path loss measurement requirement when there are different transmit powers.

Figure 3:
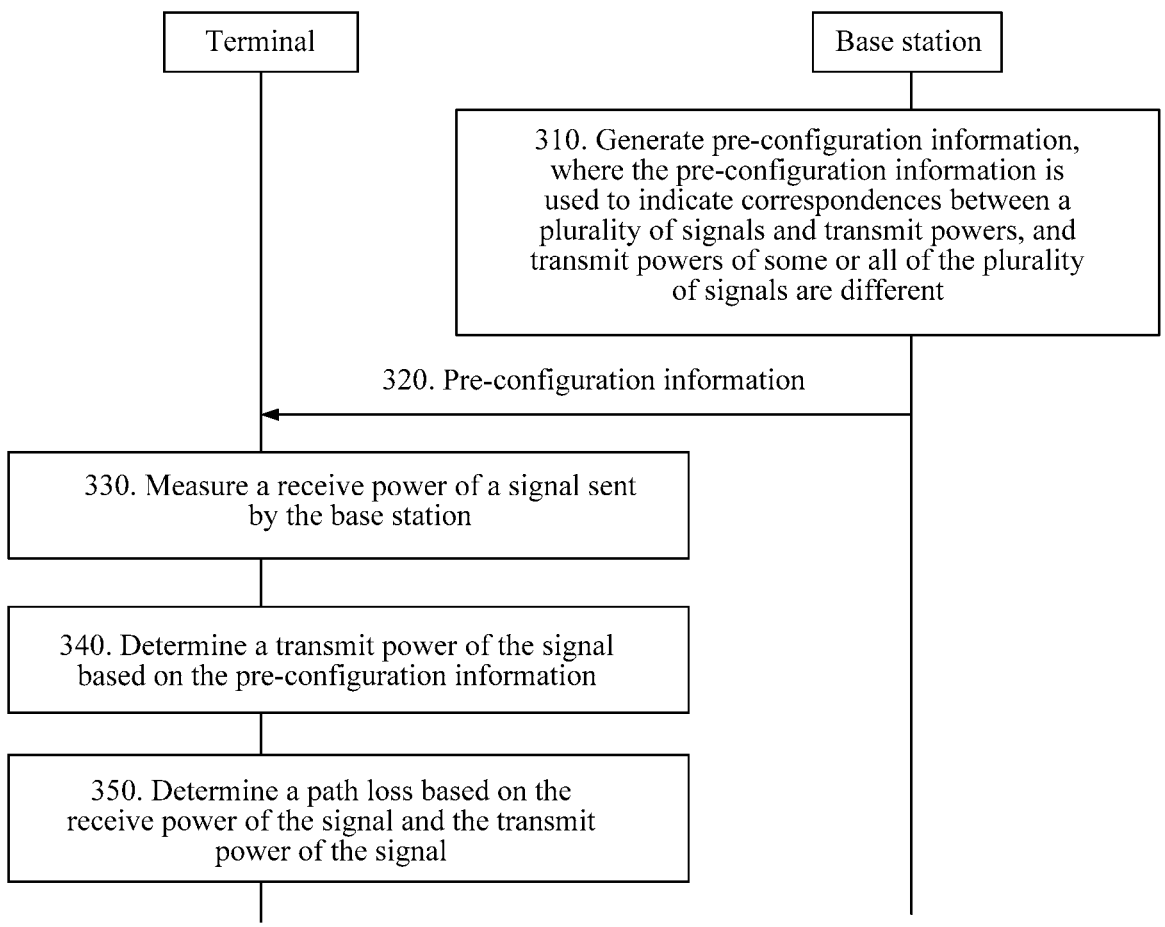
FIG. 3 is a schematic interaction diagram of a path loss determining method according to an embodiment of the present invention.

FIG. 3 is a schematic flowchart of a path loss determining method 300 according to an embodiment of the present invention. A base station and a terminal in FIG. 3 may respectively correspond to the network device 110 and the terminal 120 in FIG. 1. As shown in FIG. 3, the method 300 includes the following steps.

310. The base station generates pre-configuration information, where the pre-configuration information is used to indicate correspondences between a plurality of signals and transmit powers, and transmit powers of some or all of the plurality of signals are different.

Specifically, the plurality of signals may include a plurality of PSSs, SSSs, or PBCH DMRSs shown in FIG. 2. The plurality of signals may further include a plurality of channel state information-reference signals (CSI-RS).

320. The base station sends the pre-configuration information to the terminal.

Specifically, the base station may send the pre-configuration information to the terminal by using any one of the following messages: a master information block (MIB), a system information block (SIB), a physical broadcast channel-demodulation reference signal (PBCH DMRS), a radio resource control (RRC) message, a media access control control element (MAC-CE), and downlink control information (DCI).

Correspondingly, after receiving the pre-configuration information sent by the base station, the terminal locally stores the pre-configuration information.

330. The terminal measures a receive power of a signal sent by the base station.

Specifically, the signal whose receive power is measured may be any one of the following signals: a PSS, an SSS, a physical broadcast channel-demodulation reference signal (PBCH DMRS), or a CSI-RS.

It should be noted that the signal whose receive power is measured is one of the plurality of signals indicated in the pre-configuration information.

340. The terminal determines a transmit power of the signal based on the pre-configuration information.

Specifically, the terminal determines the transmit power of the signal based on the locally stored the pre-configuration information. Specifically, a transmit power corresponding to the signal indicated in the pre-configuration information is determined as the transmit power of the signal.

350. The terminal determines a path loss based on the receive power of the signal and the transmit power of the signal.

The path loss is an amount of loss introduced between a transmitter and a receiver by a propagation environment. Specifically, in step 350, the receive power of the signal is subtracted from the transmit power of the signal, and the path loss is determined based on a result of the subtraction.

In the method provided in this application, the correspondences between the plurality of signals and the transmit powers are pre-configured, so that when the path loss is estimated by using a signal, a transmit power corresponding to the signal can be determined based on the pre-configured correspondences. In this way, a relatively accurate transmit power can be obtained when there are different transmit powers, thereby calculating a relatively accurate path loss. Therefore, compared with the prior art, the method provided in this application can effectively satisfy a path loss measurement requirement when there are different transmit powers.

Further, the path loss obtained in step 330 to step 350 may be used to determine an uplink transmit power. Therefore, the method provided in this application can further implement proper uplink power control.

It should be noted that step 310 and step 320 are not necessarily performed each time when a path loss is determined. This is because after receiving, for the first time, the pre-configuration information sent by the base station, the terminal locally stores the pre-configuration information. When a path loss needs to be estimated subsequently, the terminal may directly locally obtain the pre-configuration information, and determine a transmit power of a corresponding signal and further estimate the path loss.

Therefore, when the terminal has the pre-configuration information locally stored, step 310 and step 320 may be omitted in the path loss determining method 300 provided in this embodiment of the present invention.

It should be understood that, the base station may update the pre-configuration information at a future moment. In this case, the base station needs to notify the terminal of updated pre-configuration information. Correspondingly, the terminal removes the old pre-configuration information, and stores the new pre-configuration information.

Optionally, in some embodiments, the method 300 further includes: obtaining, by the terminal from the base station by using at least one of a master information block (MIB) or a system information block (SIB), an update indication used to indicate that the pre-configuration information has been updated; obtaining, by the terminal from the base station, updated pre-configuration information or updated content in the pre-configuration information based on the update indication by using any one of an RRC message, a MAC-CE, or DCI.

Optionally, in this embodiment of the present invention, the pre-configuration information is used to indicate correspondences between a plurality of signal groups and transmit powers, where the plurality of signal groups are a plurality of groups obtained by classifying the plurality of signals. Signals in a same signal group have a same transmit power, and some or all of the plurality of signal groups have different transmit powers. In other words, not all transmit powers of the plurality of signal groups are the same. In step 340, the determining a transmit power of the signal based on the pre-configuration information specifically includes: determining a signal group to which the signal belongs, and determining a transmit power corresponding to the signal group to which the signal belongs as the transmit power of the signal.

In this embodiment, all or some signals having a same transmit power in the plurality of signals are classified into one signal group. Then, the correspondences between the plurality of signal groups and the transmit powers are pre-configured. Subsequently, the transmit power of the signal is determined based on the pre-configured correspondences. Therefore, this embodiment can reduce signaling overheads of the pre-configuration information.

Optionally, the plurality of signal groups may be obtained by classifying the following three classification manners:

In a first classification manner, classification is performed in a unit of an SS block. That is, the plurality of signal groups are a plurality of SS blocks (as shown in FIG. 2), where each SS block includes one PSS, one SSS, and one PBCH DMRS.

That the plurality of signal groups are obtained through classification in the first classification manner (in the unit of an SS block) means that signals in a same SS block have a same transmit power, and transmit powers of at least some of the plurality of SS blocks are different. Optionally, transmit powers of SS blocks in a same SS burst are different. However, transmit powers of SS blocks at a same location in different SS bursts are the same. For example, transmit powers of the first SS blocks in all SS bursts are the same. Alternatively, transmit powers of all of the plurality of SS blocks are different.

In a second classification manner, classification is performed in a unit of an SS burst. That is, the plurality of signal groups are a plurality of SS bursts (as shown in FIG. 2), where each SS burst includes a plurality of SS blocks, and each SS block includes one PSS, one SSS, and one PBCH DMRS.

That the plurality of signal groups are obtained through classification in the second classification manner (in the unit of an SS burst) means that SS blocks in a same SS burst have a same transmit power, and transmit powers of at least some of the plurality of SS bursts are different. Optionally, transmit powers of SS bursts in a same SS burst set are different. However, transmit powers of SS bursts at a same location in different SS burst sets are the same. For example, transmit powers of the first SS bursts in all SS burst sets are the same. Alternatively, transmit powers of all of the plurality of SS bursts are different.

In a third classification manner, classification is performed in a unit of an SS burst set. That is, the plurality of signal groups are a plurality of SS burst sets (as shown in FIG. 2), where each SS burst set includes a plurality of SS bursts, each SS burst includes a plurality of SS blocks, and each SS block includes one PSS, one SSS, and one PBCH DMRS.

That the plurality of signal groups are obtained through classification in the third classification manner (in the unit of an SS burst set) means that SS bursts in a same SS burst set have a same transmit power, and different SS burst sets have different transmit powers.

It should be noted that by way of example only but not limitation, the foregoing three classification manners of the plurality of signal groups are proposed based on the related content of the synchronization signal shown in FIG. 2. For example, based on a classification reference that signals having a same transmit power are classified into one signal group, the plurality of signal groups may further be obtained through classification in another manner different from the foregoing three classification manners. In addition, a person of ordinary skill in the art may know that, as network architectures evolve and new service scenarios emerge, related content of a synchronization signal in an NR system or another communications system that may appear in future may be different from that shown in FIG. 2. For example, different names may be assigned to the SSS, the PSS, the PBCH DMRS, the SS block, the SS burst, or the SS burst set shown in FIG. 2. For another example, a relationship between the SSS, the PSS, the PBCH DMRS, the SS block, the SS burst, and the SS burst set is not the relationship shown in FIG. 2. Therefore, if the related content of the synchronization signal in the future NR system or the another communications system that may appear is different from that shown in FIG. 2, correspondingly, the plurality of signal groups may be obtained by classifying related content of a newly appearing synchronization signal. This is not limited in this embodiment of the present invention.

It has been known from the foregoing descriptions that, causes for different transmit powers of a signal include: (1) Different base stations have different capabilities, leading to different transmit powers. (2) Different beams have different beamforming gain differences, leading to different transmit powers when the base station transmits signals by using different beams. Therefore, when the base station transmits signals by using a same beam, different signals have a same transmit and receive beamforming gain difference. In this case, when the path loss is estimated by using a signal, only a receive power and a transmit power of the signal may be considered, and there is no need to consider a transmit and receive beamforming gain difference of the signal. When the base station transmits signals by using different beams, different signals may have different transmit and receive beamforming gain differences. In this case, when the path loss is estimated by using a signal, a receive power, a transmit power, and a transmit and receive beamforming gain difference of the signal all need to be considered.

In different cases, factors needing to be considered when the path loss is determined are different. Therefore, for ease of understanding and description of the path loss determining method provided in this application, two cases are described below:

In a first case, the base station transmits signals by using a same beam. That is, different signals have a same transmit and receive beamforming gain difference. In other words, transmit and receive beamforming gain differences of the base station are the same.

In the first case, when the path loss is determined, a transmit and receive beamforming gain difference of a signal may not be considered.

In a second case, the base station transmits signals by using different beams. That is, different signals have different transmit and receive beamforming gain differences. In other words, transmit and receive beamforming gain differences of the base station are different.

In the second case, when the path loss is determined, a transmit and receive beamforming gain difference of a signal needs to be considered.

Related embodiments in the first case are described with reference to Table 1 to Table 7.

Optionally, in an embodiment, the transmit and receive beamforming gain differences of the base station are the same. The pre-configuration information is used to indicate the correspondences between the plurality of signal groups and the transmit powers.

Optionally, the pre-configuration information may indicate the correspondences between the plurality of signal groups and the transmit powers in the following configuration mode 1 or configuration mode 2.

(1) In the configuration mode 1, the pre-configuration information directly includes the correspondences between the plurality of signal groups and the transmit powers.

(2) In the configuration mode 2, the pre-configuration information includes a transmit power reference value, and further includes correspondences between the plurality of signal groups and transmit power offset values. A transmit power offset value of each signal group is an offset value of a transmit power of the signal group relative to the transmit power reference value. The transmit power reference value may be a transmit power of a signal in the plurality of signal groups or a transmit power of one of the plurality of signal groups.

With reference to Table 1, Table 2, and Table 3, in an example in which the plurality of signal groups are obtained through classification in the unit of an SS block (corresponding to the first classification manner described above), embodiments are described below in which the pre-configuration information indicates the correspondences between the plurality of signal groups and the transmit powers in the configuration mode 1 or the configuration mode 2.

In an embodiment, corresponding to the configuration mode 1, the pre-configuration information includes correspondences between a plurality of SS blocks and transmit powers. Specifically, the pre-configuration information includes correspondences between time indexes of the plurality of SS blocks and the transmit powers, as shown in Table 1.

TABLE 1

| SS block time index | Transmit power |
| --- | --- |
| 0 | Transmit power P__0 of an SS block 0 |
| 1 | Transmit power P__1 of an SS block 1 |

It should be understood that, in an example, Table 1 shows correspondences between only two SS blocks and transmit powers, but this embodiment of the present invention is not limited thereto.

Correspondingly, steps shown in FIG. 3 are specifically as follows:

In step 310, the base station directly configures a transmit power for each SS block, and generates pre-configuration information based on the configuration. That is, the pre-configuration information includes correspondences between SS block time indexes of a plurality of SS blocks and transmit powers. The pre-configuration information is shown in Table 1.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block time index corresponding to the SSS, to be specific, an SS block time index of an SS block to which the SSS belongs, and then determines a transmit power corresponding to the SS block time index corresponding to the SSS as a transmit power of the SSS.

In step 350, a path loss value is obtained based on the receive power of the SSS that is obtained in step 330 and the transmit power of the SSS that is obtained in step 340.

For example, assuming that the SSS is an SSS in an SS block whose time index is m, the path loss value Pathloss may be calculated based on the following formula:

$$Pathloss = P_m - RSRP_m$$

where $P_m$ represents a transmit power corresponding to the SS block whose time index is m in the pre-configuration information, and $RSRP_m$ represents the receive power of the SSS that is measured by the terminal.

It should be understood that, the base station may update a transmit power of each SS block at a future moment, and notify a user (the terminal) of an updated transmit power. The user (the terminal) removes the old transmit power, stores the new transmit power, and subsequently calculates a path loss value based on the new transmit power. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

In another embodiment, corresponding to the configuration mode 2, the pre-configuration information includes a transmit power reference value, and further includes correspondences between a plurality of SS blocks and transmit power offset values. Specifically, the pre-configuration information includes correspondences between time indexes of the plurality of SS blocks and the transmit power offset values. A transmit power of a signal (for example, an SSS) in the plurality of SS blocks may be configured as the transmit power reference value, or a transmit power of an SS block in the plurality of SS blocks may be configured as the transmit power reference value.

Optionally, when a transmit power of an SSS in the plurality of SS blocks is configured as the transmit power reference value, the correspondences between the time indexes of the plurality of SS blocks and the transmit power offset values included in the pre-configuration information are shown in Table 2.

TABLE 2

| SS block time index | Offset value (Offset) |
| --- | --- |
| 0 | Transmit power offset value offset__0 |
| 1 | Transmit power offset value offset__1 |

It should be understood that, in an example, Table 2 shows correspondences between only two SS blocks and transmit power offset values, but this embodiment of the present invention is not limited thereto.

Correspondingly, steps shown in FIG. 3 are specifically as follows:

In step 310, the base station configures a transmit power of an SSS as the transmit power reference value, configures a transmit power offset value of each SS block relative to the transmit power reference value, and generates pre-configuration information based on the configuration. That is, the pre-configuration information includes the transmit power reference value, and correspondences between SS block time indexes of a plurality of SS blocks and transmit power offset values. The correspondences between the SS block time indexes of the plurality of SS blocks and the transmit power offset values included in the pre-configuration information are shown in Table 2.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block time index corresponding to the SSS, to be specific, an SS block time index of an SS block to which the SSS belongs, then adds the transmit power reference value to a transmit power offset value corresponding to the SS block time index corresponding to the SSS, and determines a result of the addition as a transmit power of the SSS.

In step 350, a path loss value is obtained based on the receive power of the SSS that is obtained in step 330 and the transmit power of the SSS that is obtained in step 340.

For example, assuming that the SSS is an SSS in an SS block whose time index is m, the path loss value Pathloss may be calculated based on the following formula:

$$Pathloss = P + offset_m - RSRP_m$$

where P represents the transmit power reference value, $offset_m$ represents a transmit power offset value corresponding to the SS block whose time index is m, and $RSRP_m$ is the receive power of the SSS that is measured by the terminal.

It should be understood that, the base station may update a transmit power offset value of each SS block at a future moment, and notify a user (the terminal) of an updated transmit power offset value. The user (the terminal) removes the old transmit power offset value, stores the new transmit power offset value, and subsequently calculates a path loss value based on the new transmit power offset value. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, when a transmit power of an SS block whose time index is 0 in the plurality of SS blocks is configured as the transmit power reference value, the correspondences between the time indexes of the plurality of SS blocks and the transmit power offset values included in the pre-configuration information are shown in Table 3.

TABLE 3

| SS block time index | Offset value (Offset) |
|---|---|
| 1 | Transmit power offset value offset_1 based on an SS block 0 |
| 2 | Transmit power offset value offset_2 based on the SS block 0 |

It should be understood that, in an example, Table 3 shows correspondences between only two SS blocks and transmit power offset values, but this embodiment of the present invention is not limited thereto.

Correspondingly, steps shown in FIG. 3 are specifically as follows:

In step 310, the base station configures a transmit power of an SS block as a transmit power reference value, configures a transmit power offset value of each SS block relative to the transmit power reference value, and generates pre-configuration information based on the configuration. That is, the pre-configuration information includes the transmit power reference value, and correspondences between SS block time indexes of a plurality of SS blocks and transmit power offset values. That a transmit power of the SS block 0 is the transmit power reference value is used as an example. The correspondences between the SS block time indexes of the plurality of SS blocks and the transmit power offset values included in the pre-configuration information are shown in Table 3.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block time index corresponding to the SSS, to be specific, an SS block time index of an SS block to which the SSS belongs, then adds the transmit power reference value to a transmit power offset value corresponding to the SS block time index corresponding to the SSS, and determines a result of the addition as a transmit power of the SSS.

In step 350, a path loss value is obtained based on the receive power of the SSS that is obtained in step 330 and the transmit power of the SSS that is obtained in step 340.

For example, assuming that the SSS is an SSS in an SS block whose time index is m, the path loss value Pathloss may be calculated based on the following formula:

when $m \neq 0$, Pathloss=$P$+offset$_m$-$RSRP_m$; or when $m==0$, Pathloss=$P$-$RSRP_m$;

where P represents the transmit power reference value, offset$_m$ represents a transmit power offset value corresponding to the SS block whose time index is m, and $RSRP_m$ is the receive power of the SSS that is measured by the terminal.

It should be understood that, the base station may update a transmit power offset value of each SS block at a future moment, and notify a user (the terminal) of an updated transmit power offset value. The user (the terminal) removes the old transmit power offset value, stores the new transmit power offset value, and subsequently calculates a path loss value based on the new transmit power offset value. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

With reference to Table 4, Table 5, and Table 6, in an example in which the plurality of signal groups are obtained through classification in the unit of an SS burst (corresponding to the second classification manner described above), embodiments are described below in which the pre-configuration information indicates the correspondences between the plurality of signal groups and the transmit powers in the configuration mode 1 or the configuration mode 2.

In an embodiment, corresponding to the configuration mode 1, the pre-configuration information includes correspondences between a plurality of SS bursts and transmit powers. Specifically, the pre-configuration information includes correspondences between identifiers (ID) of the plurality of SS bursts and the transmit powers, as shown in Table 4.

TABLE 4

| SS burst ID | Transmit power |
|---|---|
| 0 | Transmit power P_0 of an SS burst 0 |
| 1 | Transmit power P_1 of an SS burst 1 |

It should be understood that, in an example, Table 4 shows correspondences between only two SS bursts and transmit powers, but this embodiment of the present invention is not limited thereto.

Correspondingly, steps shown in FIG. 3 are specifically as follows:

In step 310, the base station directly configures a transmit power for each SS burst, and generates pre-configuration information based on the configuration. That is, the pre-configuration information includes correspondences between SS burst IDs of a plurality of SS bursts and transmit powers. The pre-configuration information is shown in Table 4.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS burst ID corresponding to the SSS, to be specific, an SS burst ID of an SS burst to which the SSS belongs, and then determines a transmit power corresponding to the SS burst ID corresponding to the SSS as a transmit power of the SSS.

In step 350, a path loss value is obtained based on the receive power of the SSS that is obtained in step 330 and the transmit power of the SSS that is obtained in step 340.

For example, assuming that the SSS is an SSS in an SS block m in an SS burst j, the path loss value Pathloss may be calculated based on the following formula:

$$\text{Pathloss} = P_j - RSRP_{j,m}$$

where $P_j$ represents a transmit power corresponding to the SS burst j in the pre-configuration information, and $RSRP_{j,m}$ represents the receive power of the SSS that is measured by the terminal.

It should be understood that, the base station may update a transmit power of each SS burst at a future moment, and notify a user (the terminal) of an updated transmit power. The user (the terminal) removes the old transmit power, stores the new transmit power, and subsequently calculates a path loss value based on the new transmit power. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in another embodiment, corresponding to the configuration mode 2, the pre-configuration information includes a transmit power reference value, and further includes correspondences between a plurality of SS bursts and transmit power offset values. Specifically, the pre-configuration information includes correspondences between identifiers (ID) of the plurality of SS bursts and the transmit power offset values. A transmit power of a signal (for example, an SSS) in the plurality of SS bursts may be configured as the transmit power reference value, or a transmit power of an SS burst in the plurality of SS bursts may be configured as the transmit power reference value.

Optionally, when a transmit power of an SSS in the plurality of SS bursts is configured as the transmit power reference value, the correspondences between the IDs of the plurality of SS bursts and the transmit power offset values included in the pre-configuration information are shown in Table 5.

TABLE 5

| SS burst ID | Offset value (Offset) |
|---|---|
| 0 | Transmit power offset value offset_0 |
| 1 | Transmit power offset value offset_1 |

It should be understood that, in an example, Table 5 shows correspondences between only two SS bursts and transmit power offset values, but this embodiment of the present invention is not limited thereto.

Correspondingly, steps shown in FIG. 3 are specifically as follows:

In step 310, the base station configures a transmit power of an SSS as the transmit power reference value, configures a transmit power offset value of each SS burst relative to the transmit power reference value, and generates pre-configuration information based on the configuration. That is, the pre-configuration information includes the transmit power reference value, and correspondences between SS burst IDs of a plurality of SS bursts and transmit power offset values. The correspondences between the SS burst IDs of the plurality of SS bursts and the transmit power offset values included in the pre-configuration information are shown in Table 5.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS burst ID corresponding to the SSS, to be specific, an SS burst ID of an SS burst to which the SSS belongs, then adds the transmit power reference value to a transmit power offset value corresponding to the SS burst ID corresponding to the SSS, and determines a result of the addition as a transmit power of the SSS.

In step 350, a path loss value is obtained based on the receive power of the SSS that is obtained in step 330 and the transmit power of the SSS that is obtained in step 340.

For example, assuming that the SSS is an SSS in an SS block m in an SS burst j, the path loss value Pathloss may be calculated based on the following formula:

$$\text{Pathloss} = P + \text{offset}_j - RSRP_{j,m}$$

where P represents the transmit power reference value, $\text{offset}_j$ represents a transmit power offset value of an SS burst (that is, the SS burst j) to which the SSS belongs, and $RSRP_{j,m}$ is the receive power of the SSS that is measured by the terminal.

It should be understood that, the base station may update a transmit power offset value of each SS burst at a future moment, and notify a user (the terminal) of an updated transmit power offset value. The user (the terminal) removes the old transmit power offset value, stores the new transmit power offset value, and subsequently calculates a path loss value based on the new transmit power offset value. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Specifically, when a transmit power of an SS burst whose ID is 0 in the plurality of SS bursts is configured as the transmit power reference value, the correspondences between the IDs of the plurality of SS bursts and the transmit power offset values included in the pre-configuration information are shown in Table 6.

TABLE 6

| SS burst ID | Offset value (Offset) |
|---|---|
| 1 | Transmit power offset value offset_1 based on an SS burst 0 |
| 2 | Transmit power offset value offset_2 based on the SS burst 0 |

It should be understood that, in an example, Table 6 shows correspondences between only two SS bursts and transmit power offset values, but this embodiment of the present invention is not limited thereto.

Correspondingly, steps shown in FIG. 3 are specifically as follows:

In step 310, the base station configures a transmit power of an SS burst as the transmit power reference value, configures a transmit power offset value of each SS burst relative to the transmit power reference value, and generates pre-configuration information based on the configuration. That is, the pre-configuration information includes the transmit power reference value, and correspondences between SS burst IDs of a plurality of SS bursts and transmit power offset values. That a transmit power of the SS burst 0 is the transmit power reference value is used as an example. The correspondences between the SS burst IDs of the plurality of SS bursts and the transmit power offset values included in the pre-configuration information are shown in Table 6.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS burst ID corresponding to the SSS, to be specific, an SS burst ID of an SS burst to which the SSS belongs, then adds the transmit power reference value to a transmit power offset value corresponding to the SS burst ID corresponding to the SSS, and determines a result of the addition as a transmit power of the SSS.

In step 350, a path loss value is obtained based on the receive power of the SSS that is obtained in step 330 and the transmit power of the SSS that is obtained in step 340.

For example, assuming that the SSS is an SSS in an SS block m in an SS burst j, the path loss value Pathloss may be calculated based on the following formula:

when $j \neq 0$, Pathloss = $P + \text{offset}_j - RSRP_{j,m}$; or when $j = 0$, Pathloss = $P - RSRP_{j,m}$;

where P represents the transmit power reference value, $\text{offset}_j$ represents a transmit power offset value of an SS burst (that is, the SS burst j) to which the SSS belongs, and $RSRP_{j,m}$ is the receive power of the SSS that is measured by the terminal.

It should be understood that, the base station may update a transmit power offset value of each SS burst at a future moment, and notify a user (the terminal) of an updated transmit power offset value. The user (the terminal) removes the old transmit power offset value, stores the new transmit power offset value, and subsequently calculates a path loss value based on the new transmit power offset value. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in an embodiment, when the plurality of signal groups are obtained through classification in the unit of an SS burst (corresponding to the second classification manner described above), the pre-configuration information may further indicate the correspondences between the plurality of signal groups and the transmit powers in the following configuration mode 3.

(3) In the configuration mode 3, the pre-configuration information includes a transmit power of the first SS block in each SS burst, and further includes correspondences between other SS blocks in each SS burst than the first SS block in the current SS burst and transmit power offset values. The current SS burst is each SS burst described above.

Correspondingly, steps shown in FIG. 3 are specifically as follows:

In step 310, the base station configures a transmit power of the first SS block in each SS burst as a transmit power reference value of the current SS burst, configures a transmit power offset value that is of another SS block in each SS burst than the first SS block in the current SS burst and that is relative to the transmit power reference value of the current SS burst, and generates pre-configuration information based on the configuration. The pre-configuration information includes the transmit power of the first SS block in each SS burst, and further includes correspondences between other SS blocks in each SS burst than the first SS block in the current SS burst and transmit power offset values.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block to which the SSS belongs and an SS burst to which the SSS belongs, then adds a transmit power of the first SS block in the SS burst to which the SSS belongs to a transmit power offset value of the SS block to which the SSS belongs, and determines a result of the addition as a transmit power of the SSS.

In step 350, a path loss value is obtained based on the receive power of the SSS that is obtained in step 330 and the transmit power of the SSS that is obtained in step 340.

For example, the path loss value is calculated based on the following formula:

Pathloss=(Transmit power of the first SS block in the SS burst to which the SSS belongs)+(Transmit power offset value of the SS block to which the SSS belongs)−RSRP where RSRP is the receive power of the SSS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in an embodiment, when the plurality of signal groups are obtained through classification in the unit of an SS burst set (corresponding to the third classification manner described above), the pre-configuration information may further indicate the correspondences between the plurality of signal groups and the transmit powers in the following configuration mode 4.

(4) In the configuration mode 4, the pre-configuration information includes a transmit power of the first SS block in each SS burst set, and further includes correspondences between other SS blocks in each SS burst set than the first SS block in the current SS burst set and transmit power offset values. The current SS burst set is each SS burst set described above.

Correspondingly, steps shown in FIG. 3 are specifically as follows:

In step 310, the base station configures a transmit power of the first SS block in each SS burst set as a transmit power reference value of the current SS burst set, configures a transmit power offset value that is of another SS block in each SS burst set than the first SS block in the current SS burst set and that is relative to the transmit power reference value of the current SS burst set, and generates pre-configuration information based on the configuration. The pre-configuration information includes the transmit power of the first SS block in each SS burst set, and further includes correspondences between other SS blocks in each SS burst set than the first SS block in the current SS burst set and transmit power offset values.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block to which the SSS belongs and an SS burst set to which the SSS belongs, then adds a transmit power of the first SS block in the SS burst set to which the SSS belongs to a transmit power offset value of the SS block to which the SSS belongs, and determines a result of the addition as a transmit power of the SSS.

In step 350, a path loss value is obtained based on the receive power of the SSS that is obtained in step 330 and the transmit power of the SSS that is obtained in step 340.

For example, the path loss value is calculated based on the following formula:

Pathloss=(Transmit power of the first SS block in the SS burst set to which the SSS belongs)+ (Transmit power offset value of the SS block to which the SSS belongs)−RSRP where RSRP is the receive power of the SSS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in an embodiment, when the plurality of signal groups are obtained through classification in the unit of an SS burst set (corresponding to the third classification manner described above), the pre-configuration information may further indicate the correspondences between the plurality of signal groups and the transmit powers in the following configuration mode 5.

(5) In the configuration mode 5, the pre-configuration information includes a transmit power of the first SS burst in each SS burst set, and further includes correspondences between other SS bursts in each SS burst set than the first SS burst in the current SS burst set and transmit power offset values. The current SS burst set is each SS burst set described above.

Correspondingly, steps shown in FIG. 3 are specifically as follows:

In step 310, the base station configures a transmit power of the first SS burst in each SS burst set as a transmit power reference value of the current SS burst set, configures a transmit power offset value that is of another SS burst in each SS burst set than the first SS burst in the current SS burst set and that is relative to the transmit power reference value of the current SS burst set, and generates pre-configuration information based on the configuration. The pre-configuration information includes the transmit power of the first SS burst in each SS burst set, and further includes correspondences between other SS bursts in each SS burst set than the first SS burst in the current SS burst set and transmit power offset values.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS burst to which the SSS belongs and an SS burst set to which the SSS belongs, then adds a transmit power of the first SS burst in the SS burst set to which the SSS belongs to a transmit power offset value of the SS burst to which the SSS belongs, and determines a result of the addition as a transmit power of the SSS.

In step 350, a path loss value is obtained based on the receive power of the SSS that is obtained in step 330 and the transmit power of the SSS that is obtained in step 340.

For example, the path loss value is calculated based on the following formula:

Pathloss=(Transmit power of the first SS burst in the SS burst set to which the SSS belongs)+(Transmit power offset value of the SS burst to which the SSS belongs)-RSRP where RSRP is the receive power of the SSS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in an embodiment, the signal whose receive power is measured in step 330 may be a CSI-RS.

Specifically, the plurality of signals are a plurality of CSI-RSs. Correspondingly, the plurality of signal groups may be obtained through classification in the following several manners:

(1) a CSI-RS resource (a CSI-RS time-frequency resource location);
(2) a CSI-RS port (CSI-RS port);
(3) a CSI-RS resource ID; and
(4) a CSI-RS port ID.

In this embodiment, the pre-configuration information may indicate correspondences between the plurality of CSI-RSs and transmit powers in the configuration mode 1 or the configuration mode 2.

That the pre-configuration information indicates the correspondences between the plurality of CSI-RSs and the transmit powers in the configuration mode 1 is used as an example. The pre-configuration information includes the correspondences between the plurality of CSI-RSs and the transmit powers, as shown in Table 7.

TABLE 7

| CSI-RS resource location/port (resource/port) | Transmit power |
|---|---|
| 0 | Transmit power P0 on a CSI-RS resource/port 0 |
| 1 | Transmit power P1 on a CSI-RS resource/port 1 |

Correspondingly, steps shown in FIG. 3 are specifically as follows:

In step 310, the base station configures a transmit power of each CSI-RS, and generates pre-configuration information based on the configuration. That is, the pre-configuration information includes correspondences between a plurality of CSI-RSs and transmit powers, as shown in Table 7.

In step 320, the base station sends the pre-configuration information generated in step 310 to the terminal. Correspondingly, the terminal locally stores the pre-configuration information.

In step 330, the terminal measures a receive power of a signal sent by the base station.

The signal is one of the plurality of CSI-RSs.

In step 340, the terminal obtains a transmit power of the CSI-RS from the pre-configuration information based on a resource location or a port number (resource/port) of the CSI-RS.

In step 350, a path loss value is obtained based on the receive power of the CSI-RS that is obtained in step 330 and the transmit power of the CSI-RS that is obtained in step 340.

For example, assuming that the CSI-RS is a CSI-RS whose resource location or port number (resource/port) is m, the path loss value Pathloss may be calculated based on the following formula:

Pathloss=$P_m$-$RSRP_m$ where $P_m$ represents a transmit power corresponding to the CSI-RS whose resource location or port number (resource/port) is m in the pre-configuration information, and $RSRP_m$ is the receive power of the CSI-RS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Based on the technical solutions described with reference to Table 1 to Table 7, the correspondences between the plurality of signals and the transmit powers are pre-configured in a case of same transmit and receive beamforming gain differences of a base station, so that when the path loss is estimated by using a signal, a transmit power corresponding to the signal can be determined based on the pre-configured correspondences. In this way, a relatively accurate transmit power can be obtained when there are different transmit powers, thereby calculating a relatively accurate path loss. Therefore, compared with the prior art, the method provided in this application can effectively satisfy a path loss measurement requirement when there are different transmit powers.

The related embodiments are described above with reference to Table 1 to Table 7 when the transmit and receive beamforming gain differences of the base station are the same (that is, the first case). Related embodiments are described below with reference to Table 8 to Table 12 when the transmit and receive beamforming gain differences of the base station are different (that is, the second case).

Optionally, in an embodiment, the transmit and receive beamforming gain differences of the base station are different. The pre-configuration information is used to indicate the correspondences between the plurality of signal groups and the transmit powers, and is further used to indicate correspondences between the plurality of signal groups and transmit and receive beamforming gain differences.

Optionally, the pre-configuration information may indicate the correspondences between the plurality of signal groups and the transmit powers and the correspondences between the plurality of signal groups and the transmit and receive beamforming gain differences by using one of the configuration mode 1 and the configuration mode 2 in combination with one of the following configuration mode 6 and configuration mode 7:

(6) In the configuration mode 6, the pre-configuration information directly includes the correspondences between the plurality of signal groups and the transmit and receive beamforming gain differences.

(7) In the configuration mode 7, the pre-configuration information includes a reference value of a transmit and receive beamforming gain difference, and further includes correspondences between the plurality of signal groups and offset values of transmit and receive beamforming gain differences. It should be understood that, an offset value of a transmit and receive beamforming gain difference of a signal group is an offset value of the transmit and receive beamforming gain difference of the signal group relative to the reference value of a transmit and receive beamforming gain difference. The reference value of a transmit and receive beamforming gain difference represents a transmit and receive beamforming gain difference of a signal in the plurality of signal groups or a transmit and receive beamforming gain difference of one of the plurality of signal groups.

With reference to Table 8 and Table 9, in an example in which the plurality of signal groups are obtained through classification in the unit of an SS block (corresponding to the first classification manner described above), embodiments are described below in which the pre-configuration information indicates the correspondences between the plurality of signal groups and the transmit powers and the correspondences between the plurality of signal groups and the transmit and receive beamforming gain differences in the configuration mode 1 in combination with the configuration mode 6 or in the configuration mode 1 in combination with the configuration mode 7.

Optionally, in an embodiment, corresponding to the configuration mode 1 in combination with the configuration mode 6, the pre-configuration information includes correspondences between a plurality of SS blocks and transmit powers, and further includes correspondences between the plurality of SS blocks and transmit and receive beamforming gain differences. Specifically, the pre-configuration information includes correspondences between time indexes of the plurality of SS blocks and the transmit powers and correspondences between the time indexes of the plurality of SS blocks and the transmit and receive beamforming gain differences, as shown in Table 8.

TABLE 8

| SS block time index | Transmit power | Transmit and receive beamforming gain difference |
| --- | --- | --- |
| 0 | Transmit power P_0 | Transmit and receive beamforming gain difference V1 |
| 1 | Transmit power P_1 | Transmit and receive beamforming gain difference V2 |

It should be understood that, in an example, Table 8 shows correspondences between only two SS blocks and transmit powers and correspondences between the two SS blocks and transmit and receive beamforming gain differences, but this embodiment of the present invention is not limited thereto.

Correspondingly, steps of the method 300 shown in FIG. 3 are specifically as follows:

In step 310, the base station directly configures a transmit power (the transmit power may be for an entire cell, that is, one transmit power, for example, P, is configured for the entire cell) for each SS block, and configures a transmit and receive beamforming gain difference for each SS block. The base station generates pre-configuration information based on the configuration. The pre-configuration information includes a correspondence between a plurality of SS blocks and transmit powers, and further includes correspondences between the plurality of SS blocks and transmit and receive beamforming gain differences, as shown in Table 8.

In step 320, the base station sends the pre-configuration information to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block time index corresponding to the SSS, to be specific, an SS block time index of an SS block to which the SSS belongs, then determines a transmit power corresponding to the SS block time index corresponding to the SSS as a transmit power of the SSS, and determines a transmit and receive beamforming gain difference corresponding to the SS block time index corresponding to the SSS as a transmit and receive beamforming gain difference of the SSS.

In step 350, a path loss value is obtained based on the receive power of the SSS that is obtained in step 330 and the transmit power and the transmit and receive beamforming gain difference of the SSS that are obtained in step 340.

For example, the SSS is an SSS in an SS block m. The path loss value Pathloss may be calculated based on the following formula:

Pathloss=$P_m - RSRP_m + V_m$ where $P_m$ is a transmit power that is configured by the base station and that corresponds to the SS block m to which the SSS belongs, $V_m$ is a transmit and receive beamforming gain difference that is configured by the base station and that corresponds to the SS block m to which the SSS belongs, and $RSRP_m$ is the receive power of the SSS that is measured by the terminal.

It should be understood that, the base station may update a transmit power and/or a transmit and receive beamforming gain difference of each SS block at a future moment, and notify a user (the terminal) of an updated transmit power and/or transmit and receive beamforming gain difference of each SS block. The user (the terminal) removes the old transmit power and/or transmit and receive beamforming gain difference of each SS block, stores the new transmit power and/or transmit and receive beamforming gain difference of each SS block, subsequently calculates a path loss value based on the new transmit power and/or transmit and receive beamforming gain difference of each SS block, and calculates an uplink transmit power based on the path loss value. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in an embodiment, corresponding to the configuration mode 1 in combination with the configuration mode 7, the pre-configuration information includes correspondences between a plurality of SS blocks and transmit powers, and further includes a reference value of a transmit and receive beamforming gain difference and correspondences between the plurality of SS blocks and offset values of transmit and receive beamforming gain differences. A transmit and receive beamforming gain difference of a signal (for example, an SSS) in the plurality of SS blocks may be configured as the reference value of a transmit and receive beamforming gain difference, or a transmit and receive beamforming gain difference of an SS block in the plurality of SS blocks may be configured as the reference value of a transmit and receive beamforming gain difference. Specifically, the pre-configuration information includes correspondences between time indexes of the plurality of SS blocks and the transmit powers and correspondences between the time indexes of the plurality of SS blocks and the offset values of transmit and receive beamforming gain differences, as shown in Table 9.

TABLE 9

| SS block time index | Transmit power | Offset value of a transmit and receive beamforming gain difference |
|---|---|---|
| 0 | Transmit power P_0 | Offset value D_0 of a transmit and receive beamforming gain difference |
| 1 | Transmit power P_1 | Offset value D_1 of a transmit and receive beamforming gain difference |

It should be understood that, in an example, Table 9 shows correspondences between only two SS blocks and transmit powers and correspondences between the two SS blocks and offset values of transmit and receive beamforming gain differences, but this embodiment of the present invention is not limited thereto.

Correspondingly, steps shown in FIG. 3 are specifically as follows:

In step 310, the base station directly configures a transmit power for each SS block, and further configures a reference value of a transmit and receive beamforming gain difference and an offset value of a transmit and receive beamforming gain difference of each SS block relative to the reference value of a transmit and receive beamforming gain difference. The base station generates pre-configuration information based on the configuration. The pre-configuration information includes correspondences between SS block time indexes of a plurality of SS blocks and transmit powers, and further includes a reference value of a transmit and receive beamforming gain difference and correspondences between the SS block time indexes of the plurality of SS blocks and offset values of transmit and receive beamforming gain differences, as shown in Table 9.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block time index corresponding to the SSS, to be specific, an SS block time index of an SS block to which the SSS belongs, then determines a transmit power corresponding to the SS block time index corresponding to the SSS as a transmit power of the SSS, adds the reference value of a transmit and receive beamforming gain difference to an offset value of a transmit and receive beamforming gain difference corresponding to the SS block time index corresponding to the SSS, and determines a result of the addition as a transmit and receive beamforming gain difference of the SSS.

In step 350, a path loss value is obtained based on the receive power of the SSS that is obtained in step 330 and the transmit power and the transmit and receive beamforming gain difference of the SSS that are obtained in step 340.

For example, assuming that the SSS is an SSS in an SS block whose time index is m, the path loss value Pathloss may be calculated based on the following formula:

$$\text{Pathloss} = P_m - RSRP_m + G + D\_n$$

where $P_m$ represents a transmit power that is configured by the base station and that corresponds to the SS block to which the SSS belongs, G represents the reference value of a transmit and receive beamforming gain difference that is configured by the base station, D_n represents the offset value of a transmit and receive beamforming gain difference that is configured by the base station and that corresponds to the SS block to which the SSS belongs, $RSRP_m$ is the receive power of the SSS that is measured by the terminal.

It should be understood that, the base station may update a transmit power, and/or a reference value and/or offset value of a transmit and receive beamforming gain difference of each SS block at a future moment, and notify a user (the terminal) of an updated transmit power, and/or an updated reference value and/or offset value of a transmit and receive beamforming gain difference of each SS block. The user (the terminal) removes the old transmit power, and/or the old reference value and/or offset value of a transmit and receive beamforming gain difference of each SS block, stores the new transmit power, and/or the new reference value and/or offset value of a transmit and receive beamforming gain difference of each SS block, subsequently calculates a path loss value based on the new transmit power, and/or the new reference value and/or offset value of a transmit and receive beamforming gain difference of each SS block, and calculates an uplink transmit power based on the path loss value. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

It should be understood that, when the plurality of signal groups are obtained through classification in the unit of an SS block (corresponding to the first classification manner described above), the pre-configuration information may further indicate the correspondences between the plurality of signal groups and the transmit powers and the correspondences between the plurality of signal groups and the transmit and receive beamforming gain differences in the configuration mode 2 in combination with the configuration mode 6 or in the configuration mode 2 in combination with the configuration mode 7. Specific descriptions are similar to those described with reference to Table 8 or Table 9, and details are not described herein again.

It should further be understood that, when the plurality of signal groups are obtained through classification in the unit of an SS burst (corresponding to the second classification manner described above), the pre-configuration information may also indicate the correspondences between the plurality of signal groups and the transmit powers and the correspondences between the plurality of signal groups and the transmit and receive beamforming gain differences in either the configuration mode 1 or the configuration mode 2 in combination with either the configuration mode 6 or the configuration mode 7. Specific descriptions are similar to those described with reference to Table 8 or Table 9, and details are not described herein again.

Optionally, in an embodiment, the pre-configuration information may indicate, in the following configuration mode 8 or configuration mode 9, correspondences between the plurality of signal groups and sums of transmit powers and transmit and receive beamforming gain differences.

(8) In the configuration mode 8, the pre-configuration information directly includes the correspondences between the plurality of signal groups and the sums of transmit powers and transmit and receive beamforming gain differences.

(9) In the configuration mode 9, the pre-configuration information includes a reference value of a sum of a transmit power and a transmit and receive beamforming gain difference, and further includes correspondences between the plurality of signal groups and offset values of sums of transmit powers and transmit and receive beamforming gain differences. It should be understood that, an offset value of a sum of a transmit power and a transmit and receive beamforming gain difference of a signal group is an offset value of the sum of the transmit power and the transmit and receive beamforming gain difference of the signal group relative to the reference value of a sum of a transmit power and a transmit and receive beamforming gain difference. The reference value of a sum of a transmit power and a transmit and receive beamforming gain difference represents a sum of a transmit power and a transmit and receive beamforming gain difference of a signal in the plurality of signal groups or a sum of a transmit power and a transmit and receive beamforming gain difference of one of the plurality of signal groups.

With reference to Table 10 and Table 11, in an example in which the plurality of signal groups are obtained through classification in the unit of an SS block (corresponding to the first classification manner described above), embodiments are described below in which the pre-configuration information indicates the correspondences between the plurality of signal groups and the transmit powers in the configuration mode 8 or the configuration mode 10.

Optionally, in an embodiment, corresponding to the configuration mode 8, the pre-configuration information includes correspondences between a plurality of SS blocks and sums of transmit powers and transmit and receive beamforming gain differences. Specifically, the pre-configuration information includes correspondences between time indexes of the plurality of SS blocks and the sums of the transmit powers and the transmit and receive beamforming gain differences, as shown in Table 10.

TABLE 10

| SS block time index | Sum of a transmit power and a transmit and receive beamforming gain difference |
|---|---|
| 0 | Sum S_0 corresponding to an SS block 0 |
| 1 | Sum S_1 corresponding to an SS block 1 |

It should be understood that, in an example, Table 10 shows correspondences between only two SS blocks and sums of transmit powers and transmit and receive beamforming gain differences, but this embodiment of the present invention is not limited thereto.

Correspondingly, steps shown in FIG. 3 are specifically as follows:

In step 310, the base station configures a sum of a transmit power and a transmit and receive beamforming gain difference for each SS block, and generates pre-configuration information based on the configuration. The pre-configuration information includes correspondences between SS block time indexes of a plurality of SS blocks and sums of transmit powers and transmit and receive beamforming gain differences, as shown in Table 10.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block time index corresponding to the SSS, to be specific, an SS block time index of an SS block to which the SSS belongs, and then determines a sum of a transmit power and a transmit and receive beamforming gain difference that corresponds to the SS block time index corresponding to the SSS as a sum of a transmit power and a transmit and receive beamforming gain difference of the SSS.

In step 350, a path loss value is obtained based on the receive power of the SSS that is obtained in step 330 and the sum that is of a transmit power and a transmit and receive beamforming gain difference of the SSS and that is obtained in step 340.

For example, assuming that the SSS is an SSS in an SS block whose time index is m, the path loss value Pathloss may be calculated based on the following formula:

$$\text{Pathloss} = S\_n - RSRP_m$$

where $S\_n$ represents a sum, of a transmit power and a transmit and receive beamforming gain difference, that is configured by the base station and that corresponds to the SS block whose time index is m, and $RSRP_m$ represents the receive power of the SSS that is measured by the terminal.

It should be understood that, the base station may update a sum of a transmit power and a transmit and receive beamforming gain difference of each SS block at a future moment, and notify a user (the terminal) of an updated sum of a transmit power and a transmit and receive beamforming gain difference of each SS block. The user (the terminal) removes the old sum of a transmit power and a transmit and receive beamforming gain difference of each SS block, stores the new sum of a transmit power and a transmit and receive beamforming gain difference of each SS block, subsequently calculates a path loss value based on the new sum of a transmit power and a transmit and receive beamforming gain difference of each SS block, and calculates an uplink transmit power based on the path loss value. In other words, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in an embodiment, corresponding to the configuration mode 9, the pre-configuration information includes a reference value of a sum of a transmit power and a transmit and receive beamforming gain difference, and further includes correspondences between a plurality of SS blocks and offset values of sums of transmit powers and transmit and receive beamforming gain differences. Specifically, the pre-configuration information includes correspondences between time indexes of the plurality of SS blocks and the offset values of sums of transmit powers and transmit and receive beamforming gain differences, as shown in Table 11. A sum of a transmit power and a transmit and receive beamforming gain difference of a signal (for example, an SSS) in the plurality of SS blocks or a sum of a transmit power and a transmit and receive beamforming gain difference of an SS block in the plurality of SS blocks may be configured as the reference value of a sum of a transmit power and a transmit and receive beamforming gain difference.

TABLE 11

| SS block time index | Offset value of a sum of a transmit power and a transmit and receive beamforming gain difference |
|---|---|
| 0 | Sum offset value Soffset_0 corresponding to an SS block 0 |
| 1 | Sum offset value Soffset_1 corresponding to an SS block 1 |

It should be understood that, in an example, Table 11 shows correspondences between only two SS blocks and offset values of sums of transmit powers and transmit and receive beamforming gain differences, but this embodiment of the present invention is not limited thereto.

Correspondingly, steps shown in FIG. 3 are specifically as follows:

In step 310, the base station configures a reference value of a sum of a transmit power and a transmit and receive beamforming gain difference, and further configures an offset value of a sum of a transmit power and a transmit and receive beamforming gain difference for each SS block. The base station generates pre-configuration information based on the configuration. The pre-configuration information includes the reference value of a sum of a transmit power and a transmit and receive beamforming gain difference, and further includes correspondences between SS block time indexes of a plurality of SS blocks and offset values of sums of transmit powers and transmit and receive beamforming gain differences, as shown in Table 11.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block time index corresponding to the SSS, to be specific, an SS block time index of an SS block to which the SSS belongs, then adds the reference value of a sum of a transmit power and a transmit and receive beamforming gain difference to an offset value that is of a sum of a transmit power and a transmit and receive beamforming gain difference and that corresponds to the SS block time index of the SS block, and determines a result of the addition as a sum of a transmit power and a transmit and receive beamforming gain difference of the SSS.

In step 350, a path loss value is obtained based on the receive power of the SSS that is obtained in step 330 and the sum that is of a transmit power and a transmit and receive beamforming gain difference of the SSS and that is obtained in step 340.

For example, assuming that the SSS is an SSS in an SS block whose time index is m, the path loss value Pathloss may be calculated based on the following formula:

Pathloss=Soffset+Soffset_m−RSRP_m where Soffset represents the reference value that is of a sum of a transmit power and a transmit and receive beamforming gain difference and that is configured by the base station, Soffset_m represents the offset value, configured by the base station, of a sum of a transmit power and a transmit and receive beamforming gain difference that correspond to an SS block whose time index is m, and $RSRP_m$ represents the receive power of the SSS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

It should further be understood that, when the plurality of signal groups are obtained through classification in the unit of an SS burst (corresponding to the second classification manner described above), or when the plurality of signal groups are obtained through classification in the unit of an SS burst set (corresponding to the third classification manner described above), the pre-configuration information may also indicate, in the configuration mode 7 or the configuration mode 8, the correspondences between the plurality of signal groups and the sums of transmit powers and transmit and receive beamforming gain differences. Specific descriptions are similar to those described with reference to Table 10 and Table 11, and details are not described herein again.

Optionally, when the plurality of signal groups are obtained through classification in the unit of an SS burst (corresponding to the second classification manner described above), the pre-configuration information may indicate, in the configuration mode 3 in combination with the following configuration mode 10, correspondences between the plurality of signal groups and transmit powers and correspondences between the plurality of signal groups and transmit and receive beamforming gain differences.

(10) In the configuration mode 10, the pre-configuration information includes a transmit and receive beamforming gain difference of the first SS block in each SS burst, and further includes correspondences between other SS blocks in each SS burst than the first SS block in the current SS burst and offset values of transmit and receive beamforming gain differences. The current SS burst is each SS burst described above.

Correspondingly, steps shown in FIG. 3 are specifically as follows:

In step 310, the base station configures a transmit power of the first SS block in each SS burst as a transmit power reference value of the current SS burst, and configures transmit power offset values of other SS blocks in each SS burst than the first SS block in the current SS burst; and in addition, further configures a transmit and receive beamforming gain difference of the first SS block in each SS burst as a reference value of a transmit and receive beamforming gain difference of the current SS burst, and configures offset values of transmit and receive beamforming gain differences of other SS blocks in each SS burst than the first SS block in the current SS burst. The base station generates pre-configuration information based on the configuration. The pre-configuration information includes a transmit power and a transmit and receive beamforming gain difference of the first SS block in each SS burst, and further includes correspondences between the other SS blocks in each SS burst than the first SS block in the current SS burst and the transmit power offset values and correspondences between the other SS blocks and the offset values of transmit and receive beamforming gain differences.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block to which the SSS belongs and an SS burst to which the SSS belongs, then adds a transmit power of the first SS block in the SS burst to which the SSS belongs to a transmit power offset value corresponding to the SS block to which the SSS belongs, and determines a result of the addition as a transmit power of the SSS.

In addition, the terminal further adds a transmit and receive beamforming gain difference of the first SS block in the SS burst to which the SSS belongs to an offset value of a transmit and receive beamforming gain difference corresponding to the SS block to which the SSS belongs, and determines a result of the addition as a transmit and receive beamforming gain difference of the SSS.

In step 350, a path loss value is obtained based on the receive power of the SSS that is obtained in step 330 and the transmit power and the transmit and receive beamforming gain difference of the SSS that are obtained in step 340.

For example, the path loss value is calculated based on the following formula:

Pathloss=(Transmit power of the first SS block in the SS burst to which the SSS belongs)+(Transmit power offset value of the SS block to which the SSS belongs)+(Transmit and receive beamforming gain difference of the first SS block in the SS burst to which the SSS belongs)+(Offset value of a transmit and receive beamforming gain difference of the SS block to which the SSS belongs)−RSRP where RSRP is the receive power of the SSS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, when the plurality of signal groups are obtained through classification in the unit of an SS burst set (corresponding to the third classification manner described above), the pre-configuration information may indicate, in the configuration mode 4 in combination with the following configuration mode 11, correspondences between the plurality of signal groups and transmit powers and correspondences between the plurality of signal groups and transmit and receive beamforming gain differences.

(11) In the configuration mode 11, the pre-configuration information includes a transmit and receive beamforming gain difference of the first SS block in each SS burst set, and further includes correspondences between other SS blocks in each SS burst set than the first SS block in the current SS burst set and offset values of transmit and receive beamforming gain differences. The current SS burst set is each SS burst set described above.

Correspondingly, steps shown in FIG. 3 are specifically as follows:

In step 310, the base station configures a transmit power of the first SS block in each SS burst set as a transmit power reference value of the current SS burst set, and configures transmit power offset values of other SS blocks in each SS burst set than the first SS block in the current SS burst set; and in addition, further configures a transmit and receive beamforming gain difference of the first SS block in each SS burst set as a reference value of a transmit and receive beamforming gain difference of the current SS burst set, and configures offset values of transmit and receive beamforming gain differences of other SS blocks in each SS burst set than the first SS block in the current SS burst set. The base station generates pre-configuration information based on the configuration. The pre-configuration information includes a transmit power and a transmit and receive beamforming gain difference of the first SS block in each SS burst set, and further includes correspondences between the other SS blocks in each SS burst set than the first SS block in the current SS burst set and the transmit power offset values and correspondences between the other SS blocks and the offset values of transmit and receive beamforming gain differences.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS block to which the SSS belongs and an SS burst set to which the SSS belongs, then adds a transmit power of the first SS block in the SS burst set to which the SSS belongs to a transmit power offset value corresponding to the SS block to which the SSS belongs, and determines a result of the addition as a transmit power of the SSS.

In addition, the terminal further adds a transmit and receive beamforming gain difference of the first SS block in the SS burst set to which the SSS belongs to an offset value of a transmit and receive beamforming gain difference corresponding to the SS block to which the SSS belongs, and determines a result of the addition as a transmit and receive beamforming gain difference of the SSS.

In step 350, a path loss value is obtained based on the receive power of the SSS that is obtained in step 330 and the transmit power and the transmit and receive beamforming gain difference of the SSS that are obtained in step 340.

For example, the path loss value is calculated based on the following formula:

Pathloss=(Transmit power of the first SS block in the SS burst set to which the SSS belongs)+(Transmit power offset value of the SS block to which the SSS belongs)+(Transmit and receive beamforming gain difference of the first SS block in the SS burst set to which the SSS belongs)+(Offset value of the transmit and receive beamforming gain difference of the SS block to which the SSS belongs)−*RSRP* where RSRP is the receive power of the SSS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, when the plurality of signal groups are obtained through classification in the unit of an SS burst set (corresponding to the third classification manner described above), the pre-configuration information may indicate, in the configuration mode 5 in combination with the following configuration mode 12, correspondences between the plurality of signal groups and transmit powers and correspondences between the plurality of signal groups and transmit and receive beamforming gain differences.

(12) In the configuration mode 12, the pre-configuration information includes a transmit and receive beamforming gain difference of the first SS burst in each SS burst set, and further includes correspondences between other SS bursts in each SS burst set than the first SS burst in the current SS burst set and offset values of transmit and receive beamforming gain differences. The current SS burst set is each SS burst set described above.

Correspondingly, steps shown in FIG. 3 are specifically as follows:

In step 310, the base station configures a transmit power of the first SS burst in each SS burst set as a transmit power reference value of the current SS burst set, and configures transmit power offset values of other SS bursts in each SS burst set than the first SS burst in the current SS burst set; and in addition, further configures a transmit and receive beamforming gain difference of the first SS burst in each SS burst set as a reference value of a transmit and receive beamforming gain difference of the current SS burst set, and configures offset values of transmit and receive beamforming gain differences of other SS bursts in each SS burst set than the first SS burst in the current SS burst set. The base station generates pre-configuration information based on the configuration. The pre-configuration information includes a transmit power and a transmit and receive beamforming gain difference of the first SS burst in each SS burst set, and further includes correspondences between the other SS bursts in each SS burst set than the first SS burst in the current SS burst set and the transmit power offset values and correspondences between the other SS bursts and the offset values of transmit and receive beamforming gain differences.

In step 320, the base station sends the pre-configuration information generated in step 310 to the terminal. Correspondingly, the terminal locally stores the pre-configuration information.

In step 330, the terminal measures a receive power of a signal sent by the base station.

The signal may be at least one of an SSS, a PSS, or a PBCH DMRS. For ease of understanding and description, this embodiment is described by using an example in which the signal is an SSS. For example, in step 330, the terminal measures a receive power of an SSS sent by the base station.

In step 340, the terminal first determines an SS burst to which the SSS belongs and an SS burst set to which the SSS belongs, then adds a transmit power of the first SS burst in the SS burst set to which the SSS belongs to a transmit power offset value corresponding to the SS burst to which the SSS belongs, and determines a result of the addition as a transmit power of the SSS.

In addition, the terminal further adds a transmit and receive beamforming gain difference of the first SS burst in the SS burst set to which the SSS belongs to an offset value of a transmit and receive beamforming gain difference corresponding to the SS burst to which the SSS belongs, and determines a result of the addition as a transmit and receive beamforming gain difference of the SSS.

In step 350, a path loss value is obtained based on the receive power of the SSS that is obtained in step 330 and the transmit power and the transmit and receive beamforming gain difference of the SSS that are obtained in step 340.

For example, the path loss value is calculated based on the following formula:

Pathloss=(Transmit power of the first SS burst in the SS burst set to which the SSS belongs)+(Transmit power offset value of the SS burst to which the SSS belongs)+(Transmit and receive beamforming gain difference of the first SS burst in the SS burst set to which the SSS belongs)+(Offset value of a transmit and receive beamforming gain difference of the SS burst to which the SSS belongs)−*RSRP* where RSRP is the receive power of the SSS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Optionally, in an embodiment, the signal whose receive power is measured in step 330 may be a CSI-RS.

Specifically, the plurality of signals are a plurality of CSI-RSs. Correspondingly, the plurality of signal groups may be obtained through classification in the following several manners:

(1) a CSI-RS resource (a CSI-RS time-frequency resource location);

(2) a CSI-RS port (CSI-RS port);

(3) a CSI-RS resource ID; and (4) a CSI-RS port ID.

In this embodiment, the pre-configuration information may indicate correspondences between the plurality of CSI-RSs and transmit powers and correspondences between the plurality of CSI-RSs and transmit and receive beamforming gain differences by using one of the configuration mode 1 and the configuration mode 2 in combination with one of the foregoing configuration mode 6 and configuration mode 7:

That the pre-configuration information uses the configuration mode 1 in combination with the configuration mode 6 is used as an example. The pre-configuration information includes correspondences between a plurality of CSI-RSs and transmit powers, and further includes correspondences between the plurality of CSI-RSs and transmit and receive beamforming gain differences. The pre-configuration information is shown in Table 12.

TABLE 12

| CSI-RS resource location/port (resource/port) | Transmit power | Transmit and receive beamforming gain difference |
|---|---|---|
| 0 | Power P0 corresponding to a CSI-RS resource/port 0 | G0 |
| 1 | Power P1 corresponding to a CSI-RS resource/port 1 | G1 |

Correspondingly, steps shown in FIG. 3 are specifically as follows:

In step 310, the base station configures a transmit power and a transmit and receive beamforming gain difference for each CSI-RS, and generates pre-configuration information based on the configuration. That is, pre-configuration information includes the correspondences between the plurality of CSI-RSs and the transmit powers and the correspondences between the plurality of CSI-RSs and the transmit and receive beamforming gain differences, as shown in Table 12.

In step 320, the base station sends the pre-configuration information generated in step 310 to the terminal. Correspondingly, the terminal locally stores the pre-configuration information.

In step 330, the terminal measures a receive power of a signal sent by the base station.

The signal is one of the plurality of CSI-RSs.

In step 340, the terminal obtains a transmit power of the CSI-RS from the pre-configuration information based on a resource location or a port number (resource/port) of the CSI-RS, and further obtains a transmit and receive beamforming gain difference of the CSI-RS.

In step 350, a path loss value is obtained based on the receive power of the CSI-RS that is obtained in step 330 and the transmit power and the transmit and receive beamforming gain difference of the CSI-RS that are obtained in step 340.

For example, assuming that the CSI-RS is a CSI-RS whose resource location or port number (resource/port) is m, the path loss value Pathloss may be calculated based on the following formula:

$$Pathloss = P_m + G_m - RSRP_m$$

where $P_m$ represents a transmit power corresponding to the CSI-RS whose resource location or port number (resource/port) is m in the pre-configuration information, $G_m$ represents a transmit and receive beamforming gain difference corresponding to the CSI-RS whose resource location or port number (resource/port) is m in the pre-configuration information, and $RSRP_m$ is the receive power of the CSI-RS that is measured by the terminal.

It should be understood that, the base station may periodically or aperiodically update the pre-configuration information, and deliver updated pre-configuration information to the terminal. After obtaining the new pre-configuration information from the base station, the terminal deletes the old pre-configuration information, locally stores the new pre-configuration information, and subsequently calculates a path loss value based on the new pre-configuration information.

Based on the technical solutions described with reference to Table 8 to Table 12, the correspondences between the plurality of signals and the transmit powers and the correspondences between the plurality of signals and the transmit and receive beamforming gain differences are pre-configured in a case of different transmit and receive beamforming gain differences of the base station, so that when the path loss is estimated by using a signal, a transmit power and a transmit and receive beamforming gain difference that correspond to the signal can be determined based on the pre-configured correspondences. In this way, a relatively accurate transmit power and transmit and receive beamforming gain difference can be obtained when there are different transmit powers, thereby calculating a relatively accurate path loss. Therefore, compared with the prior art, the method provided in this application can effectively satisfy a path loss measurement requirement when there are different transmit powers.

It should further be understood that, in the foregoing described embodiments, the correspondences indicated by the pre-configuration information are all presented in a table form, but the embodiments of the present invention are not limited thereto. In actual application, a corresponding correspondence may be presented in a database form or by using another data structure.

The foregoing describes the solutions provided in the embodiments of this application mainly from a perspective of interaction between network elements. It may be understood that to implement the foregoing functions, various network elements such as a transmit-end device or a receive-end device include hardware structures and/or software modules corresponding to the various functions. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the transmit-end device or the receive-end device according to the examples of the methods. For example, various functional modules may be divided according to the corresponding functions, or two or more functions may be integrated into one processing module. The integrated module may be implemented in a form of hardware, or may be implemented in a form of a software functional module. It should be noted that, in this embodiment of this application, module division is an example, and is merely logical function division. In actual implementation, another division manner may be used. The following descriptions are made by using an example in which function modules are divided corresponding to functions.

An embodiment of this application further provides a communications apparatus 400. The communications apparatus 400 may be a terminal or a chip. The communications apparatus 400 may be configured to perform steps performed by the terminal in the foregoing method embodiments.

Figure 4:
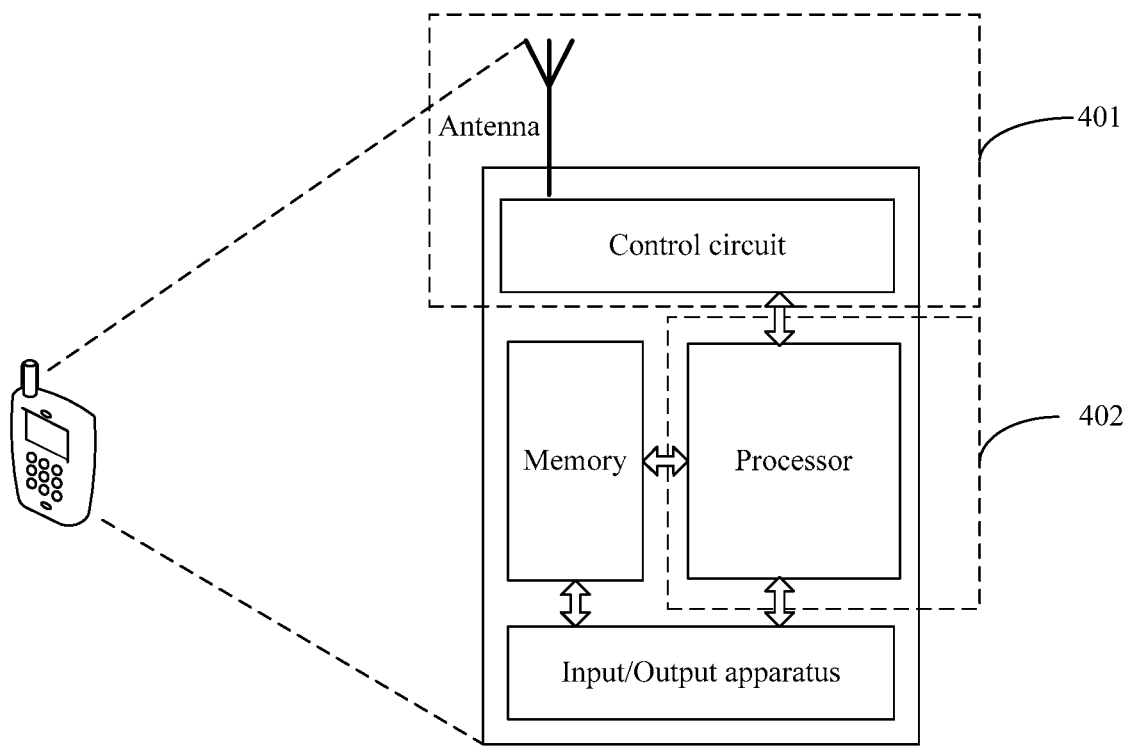
FIG. 4 is a schematic block diagram of a terminal according to an embodiment of the present invention.

When the communications apparatus 400 is a terminal, FIG. 4 is a simplified schematic structural diagram of the terminal. For ease of understanding and convenience of figure illustration, an example in which the terminal is a mobile phone is used in FIG. 4. As shown in FIG. 4, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to: receive data entered by a user and output data to the user. It should be noted that terminals of some types may not have the input/output apparatus.

When needing to send data, after performing baseband processing on to-be-sent data, the processor outputs a baseband signal to the radio frequency circuit. The radio frequency circuit performs radio frequency processing on the baseband signal and sends a radio frequency signal to outside in a form of an electromagnetic wave by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data and processes the data. For ease of description, FIG. 4 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal, and the processor having a processing function is considered as a processing unit of the terminal. As shown in FIG. 4, the terminal includes a transceiver unit 401 and a processing unit 402. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 401 may be considered as a receiving unit, and a component for implementing a sending function in the transceiver unit 401 may be considered as a sending unit. That is, the transceiver unit 401 includes a receiving unit and a sending unit. The receiving unit may also be referred to as a receiver machine, a receiver, a receiver circuit, or the like sometimes. The sending unit may also be referred to as a transmitter machine, a transmitter, a transmitter circuit, or the like sometimes.

Optionally, in an embodiment, the transceiver unit 401 is configured to receive a signal sent by a network device. The processing unit 402 is configured to measure a receive power of the signal sent by the network device. The processing unit 402 is further configured to determine a transmit power of the signal based on pre-configuration information, where the pre-configuration information is used to indicate correspondences between a plurality of signals and transmit powers, transmit powers of some or all of the plurality of signals are different, and the signal is one of the plurality of signals. The processing unit 402 is further configured to determine a path loss based on the receive power of the signal and the transmit power of the signal.

In this embodiment, the correspondences between the plurality of signals and the transmit powers are pre-configured, so that when the path loss is estimated by using a signal, a transmit power corresponding to the signal can be determined based on the pre-configured correspondences. In this way, a relatively accurate transmit power can be obtained when there are different transmit powers, thereby calculating a relatively accurate path loss. Therefore, compared with the prior art, this embodiment can effectively satisfy a path loss measurement requirement when there are different transmit powers.

Optionally, in an embodiment, the pre-configuration information is used to indicate correspondences between a plurality of signal groups and transmit powers, where the plurality of signal groups are obtained by classifying the plurality of signals, signals in a same signal group have a same transmit power, and some or all of the plurality of signal groups have different transmit powers. The processing unit 402 is specifically configured to: determine a signal group to which the signal belongs, and determine a transmit power corresponding to the signal group to which the signal belongs as the transmit power of the signal.

Optionally, in an embodiment, the pre-configuration information includes a transmit power reference value, and further includes correspondences between the plurality of signal groups and transmit power offset values, where the transmit power reference value is a transmit power of one signal in the plurality of signal groups or is a transmit power of one of the plurality of signal groups. The processing unit 402 is specifically configured to: add the transmit power reference value to a transmit power offset value corresponding to the signal group to which the signal belongs, and determine a result of the addition as the transmit power of the signal.

Optionally, in an embodiment, the pre-configuration information further includes correspondences between the plurality of signal groups and transmit and receive beamforming gain differences. The processing unit 402 is further configured to determine a transmit and receive beamforming gain difference corresponding to the signal group to which the signal belongs as a transmit and receive beamforming gain difference of the signal. The processing unit 402 is specifically configured to: add the transmit power of the signal to the transmit and receive beamforming gain difference of the signal, subtract the receive power of the signal from a result of the addition, and determine the path loss based on a result of the subtraction.

Optionally, in an embodiment, the pre-configuration information further includes a reference value of a transmit and receive beamforming gain difference, and further includes correspondences between the plurality of signal groups and offset values of transmit and receive beamforming gain differences, where the reference value of a transmit and receive beamforming gain difference is a transmit and receive beamforming gain difference of one signal in the plurality of signal groups or is a transmit and receive beamforming gain difference of one of the plurality of signal groups. The processing unit 402 is further configured to: add the reference value of a transmit and receive beamforming gain difference to an offset value of a transmit and receive beamforming gain difference corresponding to the signal group to which the signal belongs, and determine a result of the addition as a transmit and receive beamforming gain difference of the signal. The processing unit 402 is specifically configured to: add the transmit power of the signal to the transmit and receive beamforming gain difference of the signal, subtract the receive power of the signal from a result of the addition, and determine the path loss based on a result of the subtraction.

Optionally, in an embodiment, the pre-configuration information includes correspondences between the plurality of signal groups and sums of transmit powers and transmit and receive beamforming gain differences. The processing unit 402 is further configured to determine a sum of the transmit power and a transmit and receive beamforming gain difference that correspond to the signal group to which the signal belongs as a sum of the transmit power and a transmit and receive beamforming gain difference of the signal. The processing unit 402 is specifically configured to: subtract the receive power of the signal from the sum of the transmit power and the transmit and receive beamforming gain difference of the signal, and determine the path loss based on a result of the subtraction.

Optionally, in an embodiment, the pre-configuration information includes a reference value of a sum of a transmit power and a transmit and receive beamforming gain difference, and further includes correspondences between the plurality of signal groups and offset values of sums of transmit powers and transmit and receive beamforming gain differences, where the reference value of a sum of a transmit power and a transmit and receive beamforming gain difference is a sum of a transmit power and a transmit and receive beamforming gain difference of one signal in the plurality of signal groups or is a sum of a transmit power and a transmit and receive beamforming gain difference of one of the plurality of signal groups. The processing unit 402 is specifically configured to: add the reference value of a sum of a transmit power and a transmit and receive beamforming gain difference to an offset value of a sum of the transmit power and a transmit and receive beamforming gain difference that correspond to the signal group to which the signal belongs, and determine a result of the addition as a sum of the transmit power and a transmit and receive beamforming gain difference of the signal. The processing unit 402 is specifically configured to: subtract the receive power of the signal from the sum of the transmit power and the transmit and receive beamforming gain difference of the signal, and determine the path loss based on a result of the subtraction.

Optionally, in an embodiment, the pre-configuration information includes a transmit power of the first signal subgroup in each of the plurality of signal groups, and further includes correspondences between other signal subgroups than the first signal subgroup in each signal group and transmit power offset values, where each signal group includes a plurality of signal subgroups, and each signal subgroup includes at least one signal. The processing unit 402 is specifically configured to: determine a signal subgroup to which the signal belongs; and add a transmit power of the first signal subgroup in the signal group to which the signal belongs to a transmit power offset value corresponding to the signal subgroup to which the signal belongs, and determine a result of the addition as the transmit power of the signal.

Optionally, in an embodiment, the pre-configuration information further includes a transmit and receive beamforming gain difference of the first signal subgroup in each of the plurality of signal groups, and further includes correspondences between other signal subgroups than the first signal subgroup in each signal group and offset values of transmit and receive beamforming gain differences. The processing unit 402 is further configured to: add a transmit and receive beamforming gain difference of the first signal subgroup in the signal group to which the signal belongs to an offset value of a transmit and receive beamforming gain difference corresponding to the signal subgroup to which the signal belongs, and determine a result of the addition as a transmit and receive beamforming gain difference of the signal. The processing unit 402 is specifically configured to: add the transmit power of the signal to the transmit and receive beamforming gain difference of the signal, subtract the receive power of the signal from a result of the addition, and determine the path loss based on a result of the subtraction.

Optionally, in an embodiment, the pre-configuration information includes a sum of a transmit power and a transmit and receive beamforming gain difference of the first signal subgroup in each of the plurality of signal groups, and further includes correspondences between other signal subgroups than the first signal subgroup in each signal group and offset values of sums of transmit powers and transmit and receive beamforming gain differences, where each signal group includes a plurality of signal subgroups, and each signal subgroup includes at least one signal. The processing unit 402 is specifically configured to: determine a signal subgroup to which the signal belongs; and add a sum of a transmit power and a transmit and receive beamforming gain difference of the first signal subgroup in the signal group to which the signal belongs to an offset value of a sum of a transmit power and a transmit and receive beamforming gain difference that correspond to the signal subgroup to which the signal belongs, and determine a result of the addition as a sum of the transmit power and a transmit and receive beamforming gain difference of the signal. The processing unit 402 is specifically configured to: subtract the receive power of the signal from the sum of the transmit power and the transmit and receive beamforming gain difference of the signal, and determine the path loss based on a result of the subtraction.

Optionally, in an embodiment, the pre-configuration information is one of a plurality of types of pre-configuration information, and different pre-configuration information in the plurality of types of pre-configuration information indicates different correspondences between signals and transmit powers and/or different correspondences between signals and transmit and receive beamforming gain differences. The transceiver unit 401 is further configured to receive a notification message sent by the network device, where the notification message is used to instruct to determine the path loss by using the pre-configuration information.

Optionally, in an embodiment, the transceiver unit 401 is further configured to obtain the pre-configuration information from the network device by using any one of the following messages: a master information block MIB, a system information block SIB, a physical broadcast channel-demodulation reference signal PBCH DMRS, a radio resource control RRC message, a media access control control element MAC-CE, and downlink control information DCI.

Optionally, in an embodiment, the transceiver unit 401 is further configured to: obtain an update indication from the network device by using at least one of a master information block MIB or a system information block SIB, where the update indication is used to indicate that the pre-configuration information has been updated; and obtain, from the network device by using any one of the following messages, information that has been updated in the pre-configuration information: an RRC message, a MAC-CE, and DCI.

For specific descriptions of the plurality of signal groups, refer to the descriptions in the foregoing method embodiments. For brevity, details are not described herein again.

When the communications apparatus 400 is a chip, the chip includes a transceiver unit and a processing unit. The transceiver unit may be an input/output circuit or a communications interface. The processing unit is a processor, a microprocessor, or an integrated circuit that is integrated on the chip.

An embodiment of this application further provides a communications apparatus 500. The communications apparatus 500 may be a network device or a chip. The communications apparatus 500 may be configured to perform steps performed by the base station in the foregoing method embodiments.

Figure 5:
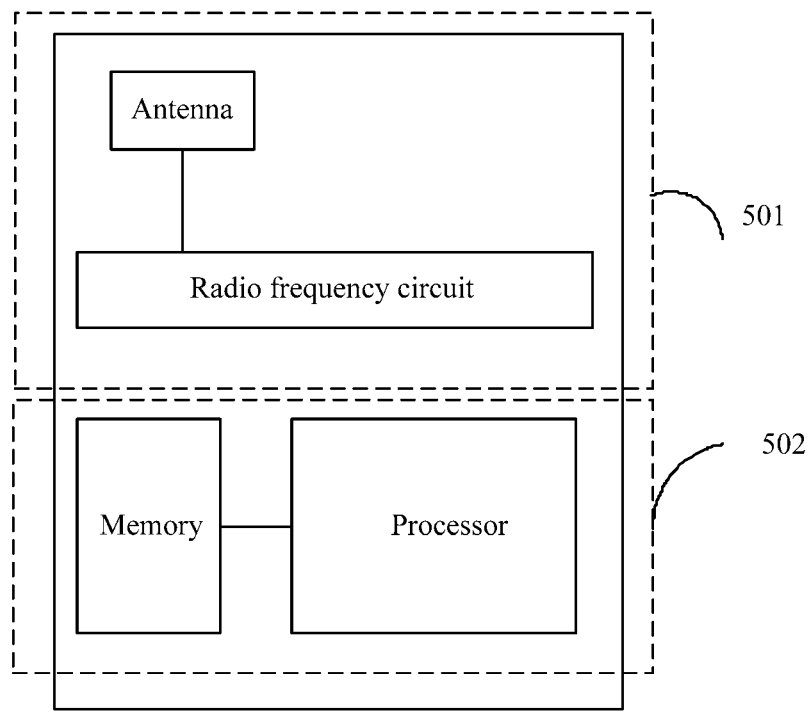
FIG. 5 is a schematic block diagram of a network device according to an embodiment of the present invention.

When the communications apparatus is a network device, which is specifically, for example, a base station, FIG. 5 is a simplified schematic structural diagram of the base station. The base station includes a part 501 and a part 502. The part 501 is mainly configured to send and receive a radio frequency signal and perform conversion between the radio frequency signal and a baseband signal. The part 502 is mainly configured to perform baseband processing, control the base station, and the like. The part 501 may be usually referred to as a transceiver unit, a transceiver machine, a transceiver circuit, a transceiver, or the like. The part 502 is usually a control center of the base station, may be usually referred to as a processing unit, and is configured to control the base station to perform steps performed by the base station in the foregoing method embodiments.

The part 501 includes an antenna and a radio frequency unit. The radio frequency unit is mainly configured to perform radio frequency processing. Optionally, a component for implementing a receiving function in the part 501 may be considered as a receiving unit, and a component for implementing a sending function may be considered as a sending unit. That is, the part 501 includes a receiving unit and a sending unit. The receiving unit may also be referred to as a receiver machine, a receiver, a receiver circuit, or the like. The sending unit may also be referred to as a transmitter machine, a transmitter, a transmitter circuit, or the like.

The part 502 may include one or more boards. Each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards share one or more processors at the same time.

Optionally, in an embodiment, the processing unit is configured to generate pre-configuration information, where the pre-configuration information is used to indicate correspondences between a plurality of signals and transmit powers, and transmit powers of some or all of the plurality of signals are different. The transceiver unit is configured to send the pre-configuration information to a terminal, so that the terminal determines a transmit power of one or more of the plurality of signals based on the pre-configuration information.

Specifically, the pre-configuration information is used to indicate correspondences between a plurality of signal groups and transmit powers, where the plurality of signal groups are obtained by classifying the plurality of signals, signals in a same signal group have a same transmit power, and some or all of the plurality of signal groups have different transmit powers.

In an optional implementation, the processing unit is configured to generate the pre-configuration information in a case of same transmit and receive beamforming gain differences of the base station, where the pre-configuration information is used to indicate correspondences between a plurality of signal groups and transmit powers.

In another optional implementation, the processing unit is configured to generate the pre-configuration information in a case of same transmit and receive beamforming gain differences of the base station, where the pre-configuration information is used to indicate correspondences between a plurality of signal groups and transmit powers, and is further used to indicate correspondences between a plurality of signal groups and transmit and receive beamforming gain differences.

For specific descriptions of the pre-configuration information, refer to the related descriptions in the foregoing method embodiments. For brevity, details are not described herein again.

Optionally, in an embodiment, the pre-configuration information is one of a plurality of types of pre-configuration information, and different pre-configuration information in the plurality of types of pre-configuration information indicates different correspondences between signals and transmit powers and/or different correspondences between signals and transmit and receive beamforming gain differences. The transceiver unit is further configured to send a notification message to the terminal, where the notification message is used to instruct to determine a path loss by using the pre-configuration information.

Optionally, in an embodiment, the transceiver unit is specifically configured to send the pre-configuration information to the terminal by using any one of the following messages: a master information block MIB, a system information block SIB, a physical broadcast channel-demodulation reference signal PBCH DMRS, a radio resource control RRC message, a media access control control element MAC-CE, and downlink control information DCI.

Optionally, in an embodiment, the transceiver unit is further configured to: send an update indication to the terminal by using at least one of a master information block MIB or a system information block SIB, where the update indication is used to indicate that the pre-configuration information has been updated; and send, to the terminal by using any one of the following messages, information that has been updated in the pre-configuration information: an RRC message, a MAC-CE, and DCI.

When the communications apparatus 500 is a chip, the chip includes a transceiver unit and a processing unit. The transceiver unit may be an input/output circuit or a communications interface. The processing unit is a processor, a microprocessor, or an integrated circuit that is integrated on the chip.

For explanations and beneficial effects of related content in any of the foregoing provided communications apparatuses, refer to corresponding method embodiments provided above, and details are not described herein again.

Some or all of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, some or all of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to various embodiments, in the processes in this application as claimed in the embodiments, a person skilled in the art may understand and implement other variants of the disclosed embodiments.

An embodiment of the present invention further provides a chip. The chip includes a communications interface and a processor. The processor is configured to control the communications interface to send or receive a signal, and is configured to process a signal received by the communications interface or generate a signal to be sent by the communications interface.

Specifically, the processor is configured to perform procedures or steps on a terminal side in the method 300 provided in the foregoing method embodiments.

Alternatively, the processor is configured to perform procedures or steps on a base station side in the method 300 provided in the foregoing method embodiments.

Optionally, the chip further includes a storage module. The storage module stores an instruction. The processor reads the instruction stored in the storage module, to perform a related operation and control the communications interface to perform related sending and receiving operations.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform some or all of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A path loss determining method, applied to a path loss determining apparatus, the method comprising:
    measuring receive power of a channel state information-reference signal (CSI-RS) sent by a network device;
    receiving pre-configuration information sent by the network device,
        wherein the pre-configuration information comprises transmit power of a synchronization signal (SS), and further comprises an association between a plurality of CSI-RSs and a plurality of transmit power offset values,
        wherein the association relates each of one or more groups comprising the plurality of CSI-RSs and a transmit power offset value of the plurality of transmit power offset values, and
wherein each of the transmit power offset values is an offset value relative to a transmit power reference value that is a transmit power of one of the CSI-RSs in the one or more groups;
determining one of the transmit power offset values from the pre-configuration information;
determining a transmit power of the received CSI-RS based on the determined transmit power offset value and the transmit power of the SS; and
determining a path loss based on the receive power of the CSI-RS and the determined transmit power of the CSI-RS.

2. The method according to claim 1, further comprising determining uplink transmit power based on the path loss.

3. The method according to claim 1, wherein determining the transmit power of the received CSI-RS comprises:
adding the determined transmit power offset value of the CSI-RS to the transmit power of the SS, to obtain the determined transmit power of the CSI-RS.

4. The method according to claim 1, wherein receiving the pre-configuration information sent by the network device comprises:
receiving a system message sent by the network device, wherein the system message carries the transmit power of the SS; and
receiving radio resource control (RRC) layer signaling sent by the network device, wherein the RRC layer signaling carries the association between the plurality of CSI-RSs and the plurality of transmit power offset values.

5. The path loss determining method of claim 1, wherein the plurality of CSI-RSs consists of one group.

6. A path loss determining apparatus comprising:
a processor configured to measure receive power of a channel state information-reference signal (CSI-RS) sent by a network device;
a receiver configured to cooperate with the processor to receive pre-configuration information sent by the network device,
wherein the pre-configuration information comprises transmit power of a synchronization signal (SS), and further comprises an association between a plurality of CSI-RSs and a plurality of transmit power offset values,
wherein the association relates each of one or more groups comprising the plurality of CSI-RSs and a transmit power offset value of the plurality of transmit power offset values, and
wherein each of the transmit power offset values is an offset value relative to a transmit power reference value that is a transmit power of one of the CSI-RSs in the one or more groups; and
the processor is further configured to:
determine one of the transmit power offset values from the pre-configuration information,
determine a transmit power of the received CSI-RS based on the determined transmit power offset value and the transmit power of the SS, and
determine a path loss based on the receive power of the CSI-RS and the determined transmit power of the CSI-RS.

7. The apparatus according to claim 6, wherein the processor is further configured to determine uplink transmit power based on the path loss.

8. The apparatus according to claim 6, wherein the processor is configured to add the determined transmit power offset value of the CSI-RS to the transmit power of the SS, to obtain the determined transmit power of the CSI-RS.

9. The apparatus according to claim 6, wherein the receiver is further configured to cooperate with the processor to:
receive a system message sent by the network device, wherein the system message carries the transmit power of the SS; and
receive radio resource control (RRC) layer signaling sent by the network device, wherein the RRC layer signaling carries the association between the plurality of CSI-RSs and the plurality of transmit power offset values.

10. The apparatus according to claim 6, wherein the plurality of CSI-RSs consists of one group.

11. A non-transitory computer-readable storage medium, storing a computer-executable program, which when executed by a processor, causes the processor to implement operations including:
measuring receive power of a channel state information-reference signal (CSI-RS) sent by a network device;
receiving pre-configuration information sent by the network device,
wherein the pre-configuration information comprises transmit power of a synchronization signal (SS), and further comprises an association between a plurality of CSI-RSs and a plurality of transmit power offset values,
wherein the association relates each of one or more groups comprising the plurality of CSI-RSs and a transmit power offset value of the plurality of transmit power offset values, and
wherein each of the transmit power offset values is an offset value relative to a transmit power reference value that is a transmit power of one of the CSI-RSs in the one or more groups;
determining one of the transmit power offset values from the pre-configuration information;
determining transmit power of the received CSI-RS based on the determined transmit power offset value and the transmit power of the SS; and
determining a path loss based on the receive power of the CSI-RS and the determined transmit power of the CSI-RS.

12. The non-transitory computer-readable storage medium according to claim 11, wherein the operations further comprise determining uplink transmit power based on the path loss.

13. The non-transitory computer-readable storage medium according to claim 11, wherein the operation of determining the transmit power of the received CSI-RS based on the determined transmit power offset value and the transmit power of the SS comprises:
adding the determined transmit power offset value of the CSI-RS to the transmit power of the SS, to obtain the determined transmit power of the CSI-RS.

14. The non-transitory computer-readable storage medium according to claim 11, wherein the operation of receiving the pre-configuration information sent by the network device comprises:
receiving a system message sent by the network device, wherein the system message carries the transmit power of the SS; and receiving radio resource control (RRC) layer signaling sent by the network device, wherein the RRC layer signaling carries the association between the plurality of CSI-RSs and the plurality of transmit power offset values.

15. The non-transitory computer-readable storage medium according to claim 11, wherein the plurality of CSI-RSs consists of one group.

* * * * *